(12) United States Patent
Herzog

(10) Patent No.: US 11,007,714 B2
(45) Date of Patent: May 18, 2021

(54) DEVICE FOR THE ADDITIVE PRODUCTION OF A THREE-DIMENSIONAL OBJECT

(71) Applicant: CL SCHUTZRECHTSVERWALTUNGS GMBH, Lichtenfels (DE)

(72) Inventor: Frank Herzog, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 431 days.

(21) Appl. No.: 16/079,983

(22) PCT Filed: Feb. 27, 2017

(86) PCT No.: PCT/EP2017/054498
§ 371 (c)(1),
(2) Date: Aug. 24, 2018

(87) PCT Pub. No.: WO2017/157648
PCT Pub. Date: Sep. 21, 2017

(65) Prior Publication Data
US 2019/0061242 A1    Feb. 28, 2019

(30) Foreign Application Priority Data

Mar. 18, 2016  (DE) .......................... 102016105097.0

(51) Int. Cl.
*B29C 64/209*  (2017.01)
*B22F 3/105*  (2006.01)
(Continued)

(52) U.S. Cl.
CPC .......... *B29C 64/209* (2017.08); *B22F 3/1055* (2013.01); *B29C 64/153* (2017.08);
(Continued)

(58) Field of Classification Search
CPC .... B29C 64/153; B29C 64/209; B29C 64/268
See application file for complete search history.

(56) References Cited

U.S. PATENT DOCUMENTS

| 5,993,554 A | 11/1999 | Keicher et al. |
| 7,045,738 B1 | 5/2006 | Kovacevic et al. |

(Continued)

FOREIGN PATENT DOCUMENTS

| DE | 10235434 A1 | 2/2004 |
| DE | 102007018601 A1 | 10/2008 |

(Continued)

OTHER PUBLICATIONS

International Search Report Corresponding to Application No. PCT/EP2017/054498 dated May 8, 2017.

(Continued)

*Primary Examiner* — James Sanders
(74) *Attorney, Agent, or Firm* — Dority Manning, P A.

(57) ABSTRACT

An apparatus (1) for additive manufacturing of a three-dimensional object by successive layer-by-layer selective illumination and thus selective solidification of construction material layers (9) formed in a construction plane (10), consisting of a solidifiable construction material (2) by means of at least one energy beam (3), comprising a housing structure (4), and a combined coating and illumination assembly (6) firmly arranged or formed on the housing structure (4) of the apparatus, comprising a coating device (8) provided for applying the construction material (2) into the construction plane (10) and for forming construction material layers (9) to be solidified in the construction plane (10), and an illumination device (11) provided for the selective illumination of respective construction material layers (9) formed in the construction plane (10) by means of the coating device (8), and a carrying device (15).

20 Claims, 13 Drawing Sheets

Figure 6:
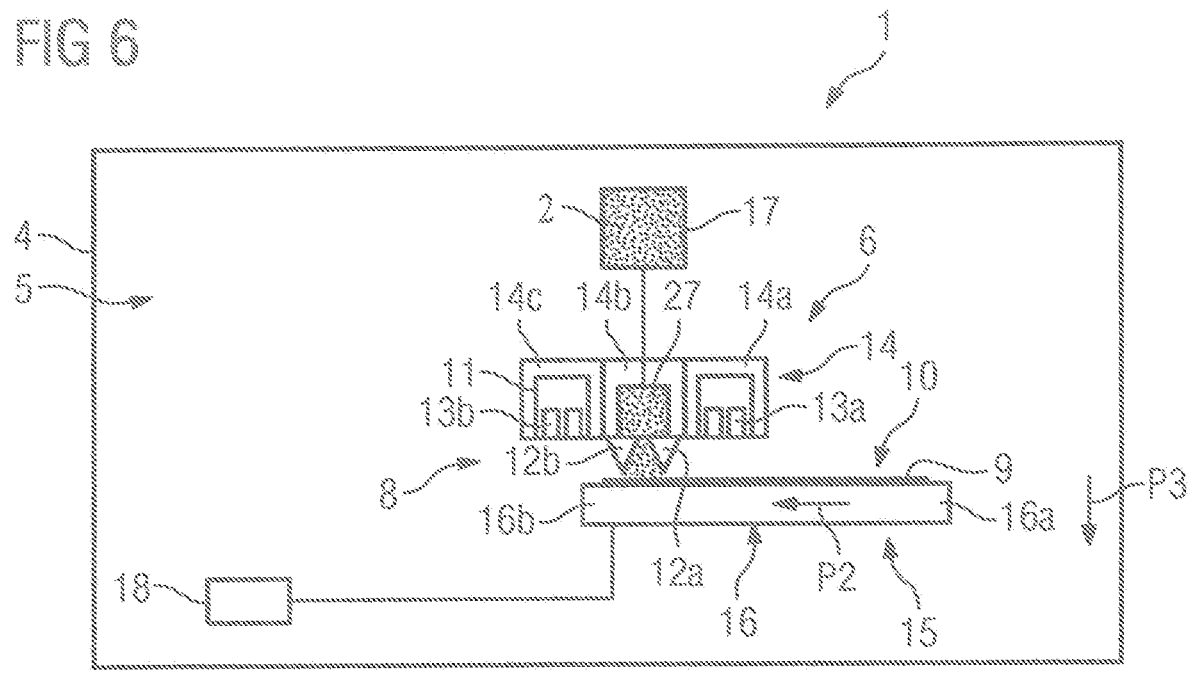
Figure 7:
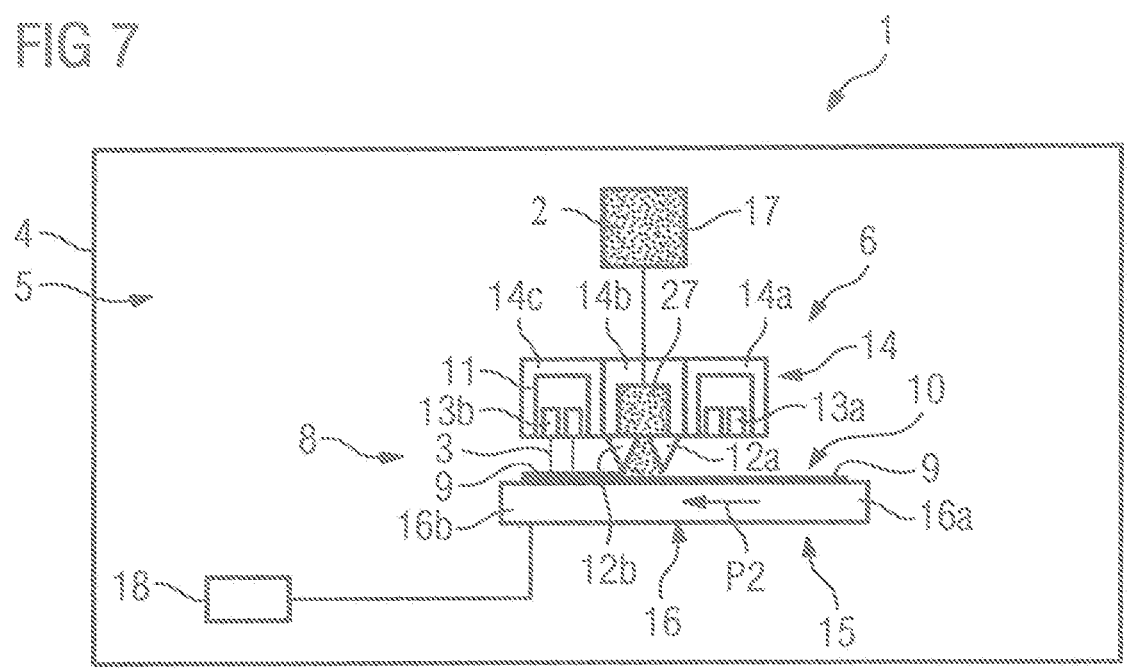

(51) Int. Cl.
*B33Y 10/00* (2015.01)
*B33Y 30/00* (2015.01)
*B29C 64/153* (2017.01)
*B29C 64/268* (2017.01)

(52) U.S. Cl.
CPC ............ *B29C 64/268* (2017.08); *B33Y 10/00* (2014.12); *B33Y 30/00* (2014.12); *B22F 2003/1056* (2013.01); *Y02P 10/25* (2015.11)

(56) References Cited

U.S. PATENT DOCUMENTS

| | | | |
|---|---|---|---|
| 8,585,853 | B2 | 11/2013 | Yamamoto et al. |
| 2011/0061591 | A1 | 3/2011 | Stecker |
| 2015/0064047 | A1 | 3/2015 | Hyde et al. |

FOREIGN PATENT DOCUMENTS

| | | |
|---|---|---|
| DE | 102009036153 A1 | 2/2011 |
| DE | 102013226670 A1 | 6/2014 |
| DE | 102013210242 A1 | 12/2014 |
| EP | 3106288 A1 | 12/2016 |
| JP | 2011/241450 A | 12/2011 |
| JP | 2015/205455 A | 11/2015 |

OTHER PUBLICATIONS

Chinese Search Report Corresponding to Application No. 20178001724 dated Jan. 21, 2019.
Machine Translated Japanese Office Action Corresponding to Application No. 2018506522 dated Jan. 28, 2019.
Chinese Supplementary Search Report Corresponding to Application No. 20178001724 dated Oct. 11, 2019.
Machine Translated Japanese Office Action corresponding to Application No. 2018506522 dated Oct. 24, 2019.

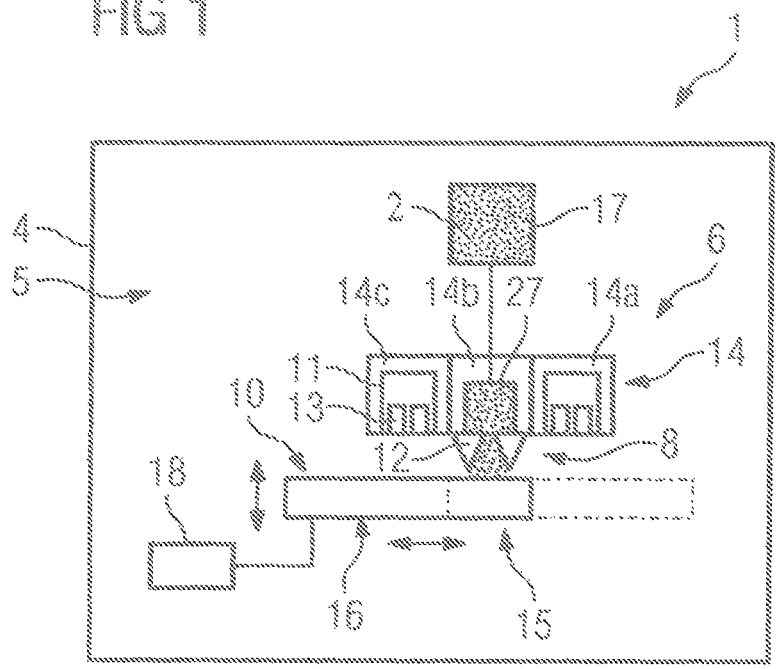

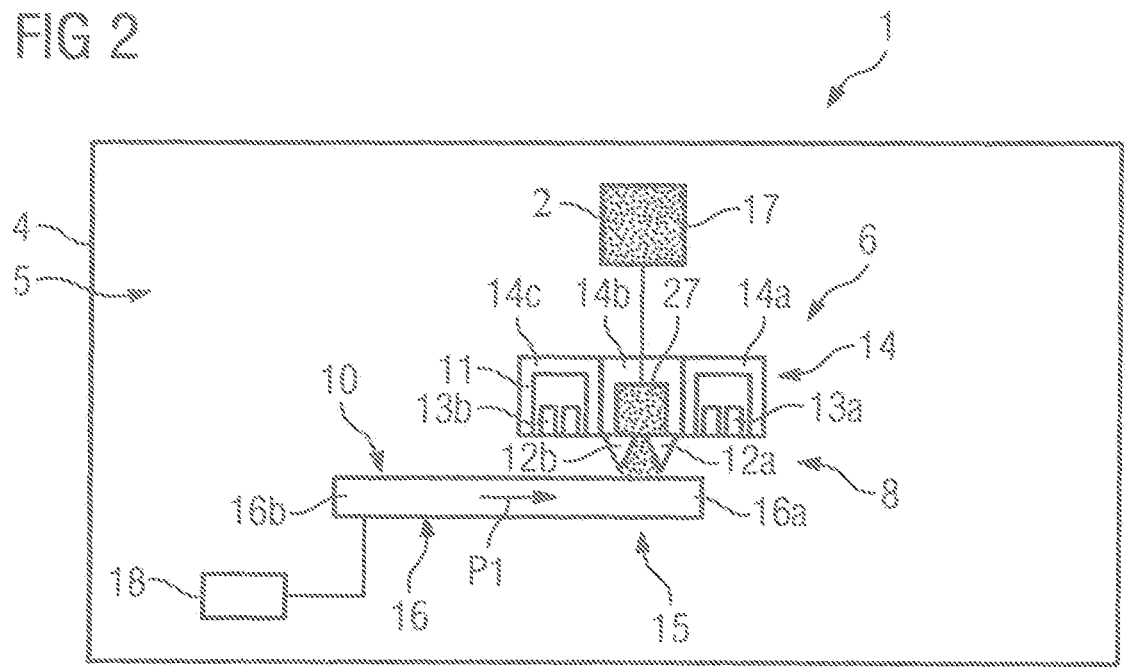
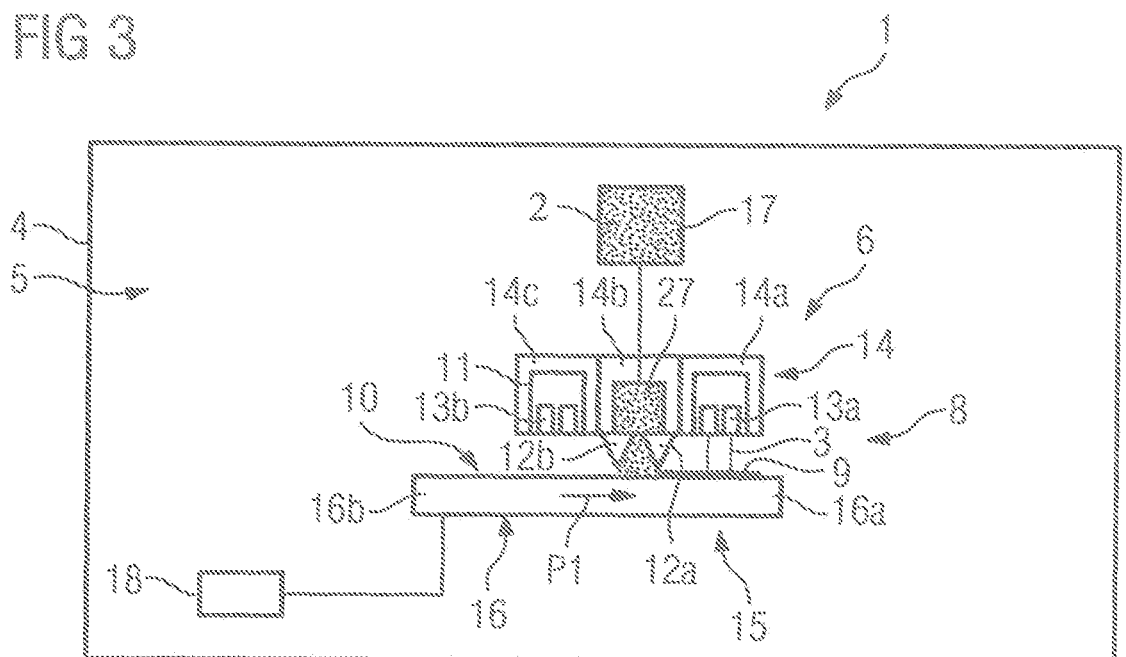

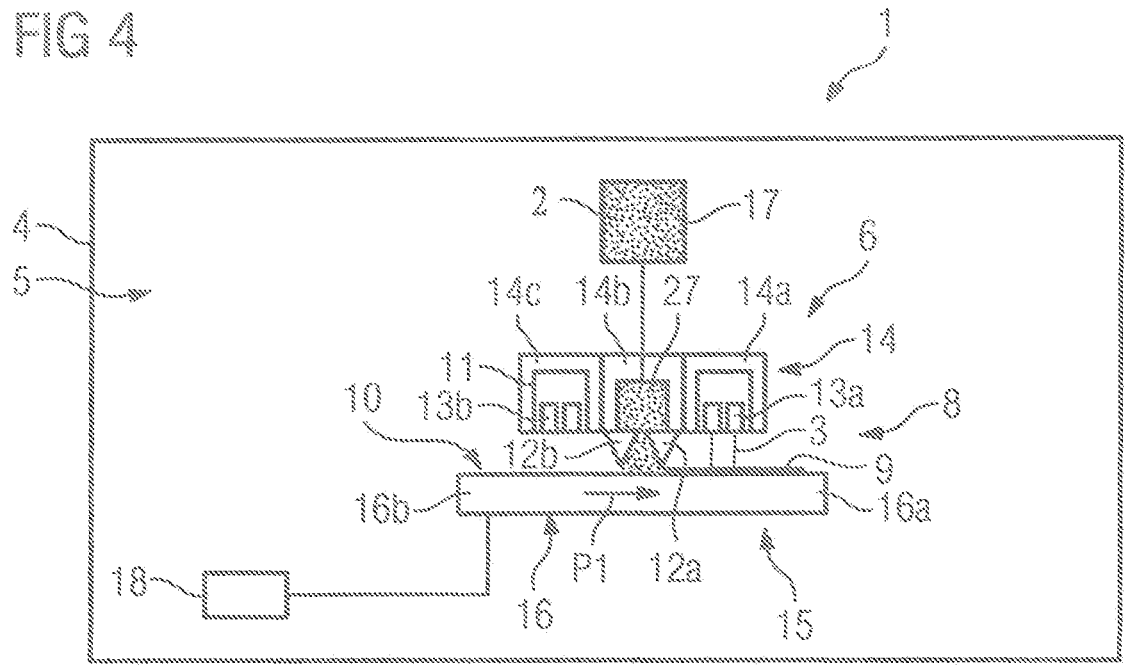
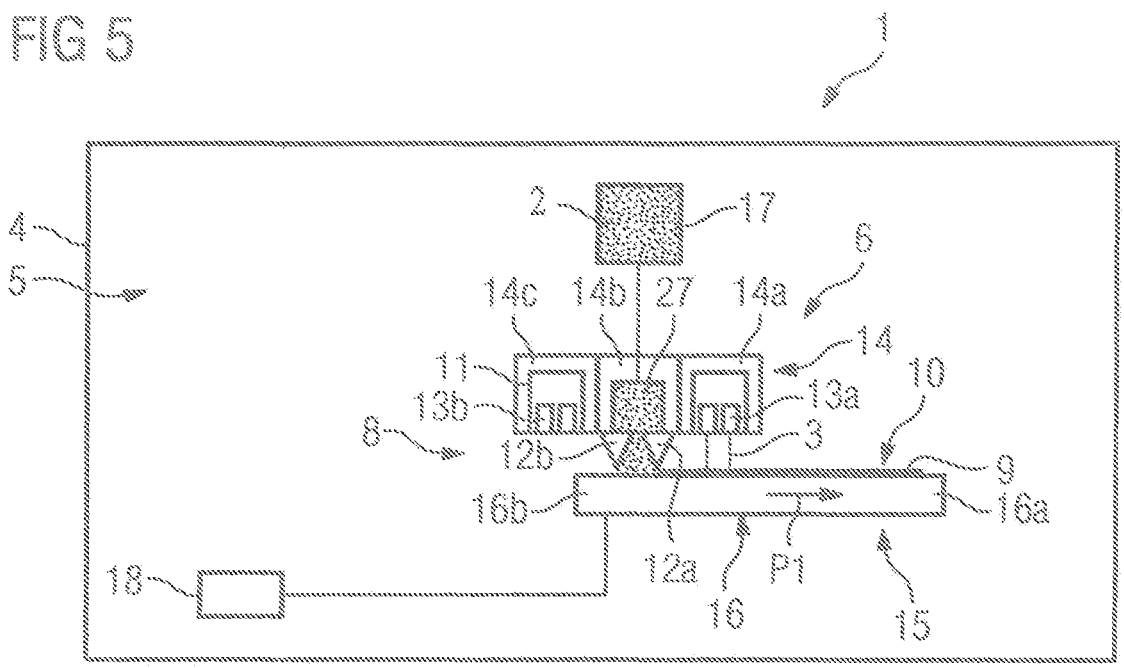

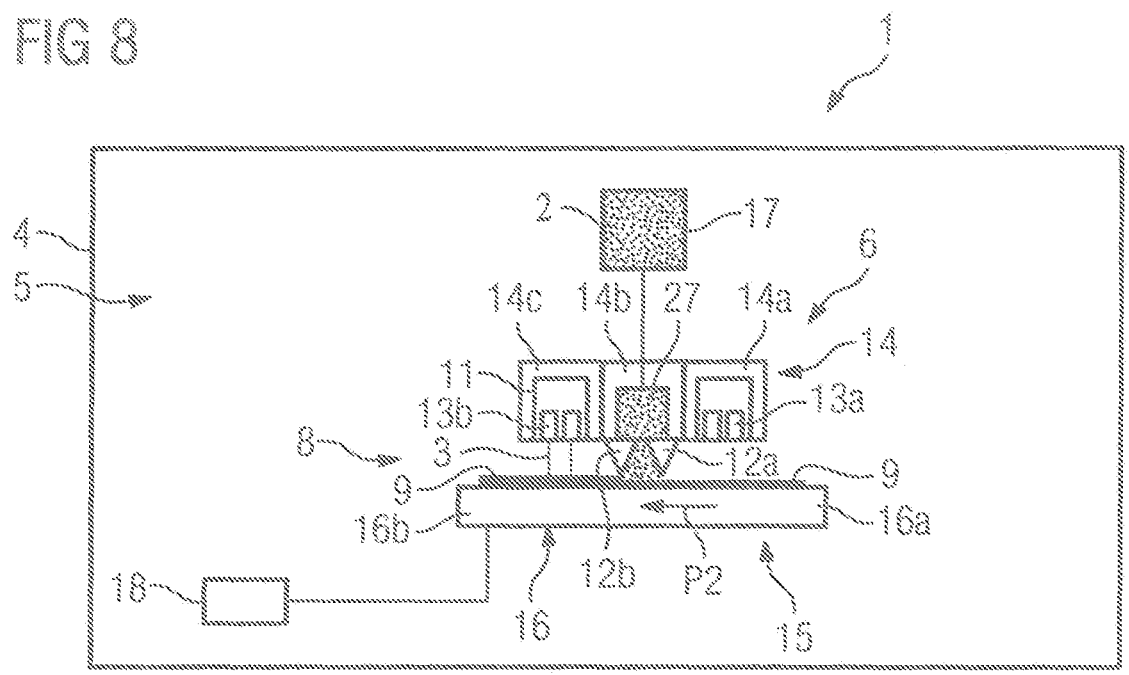
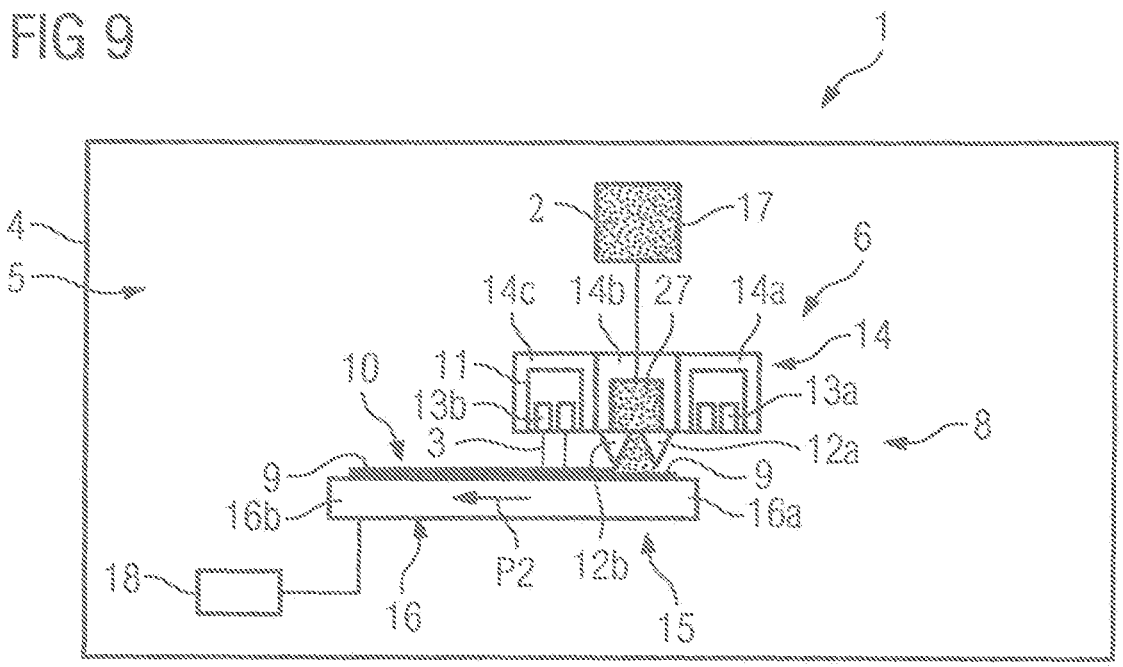

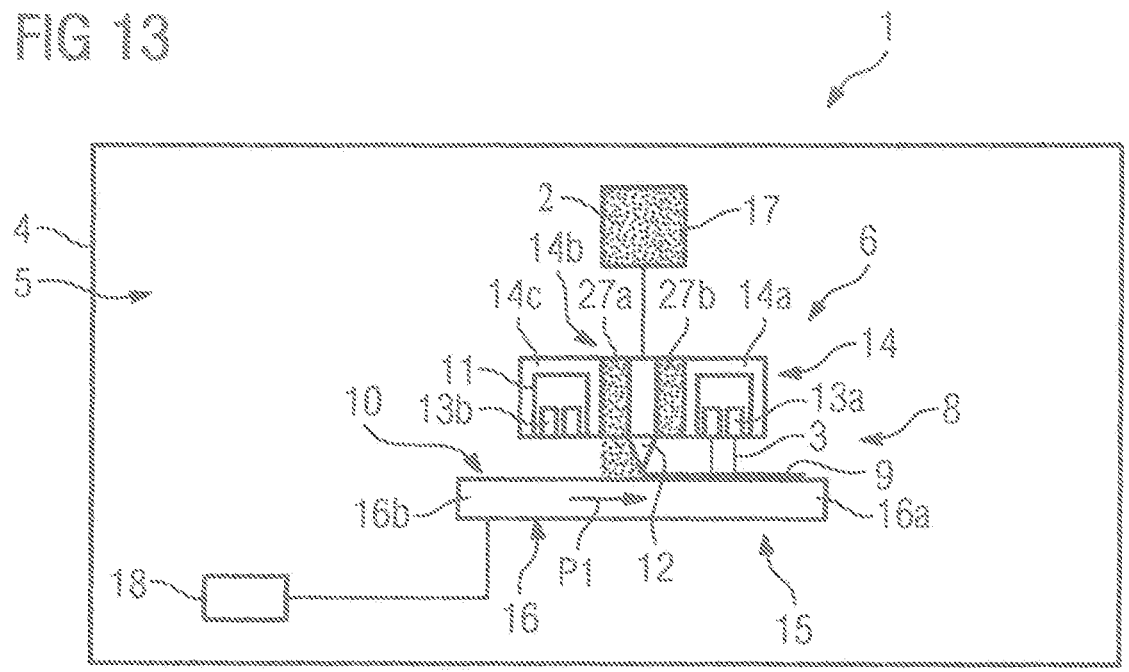
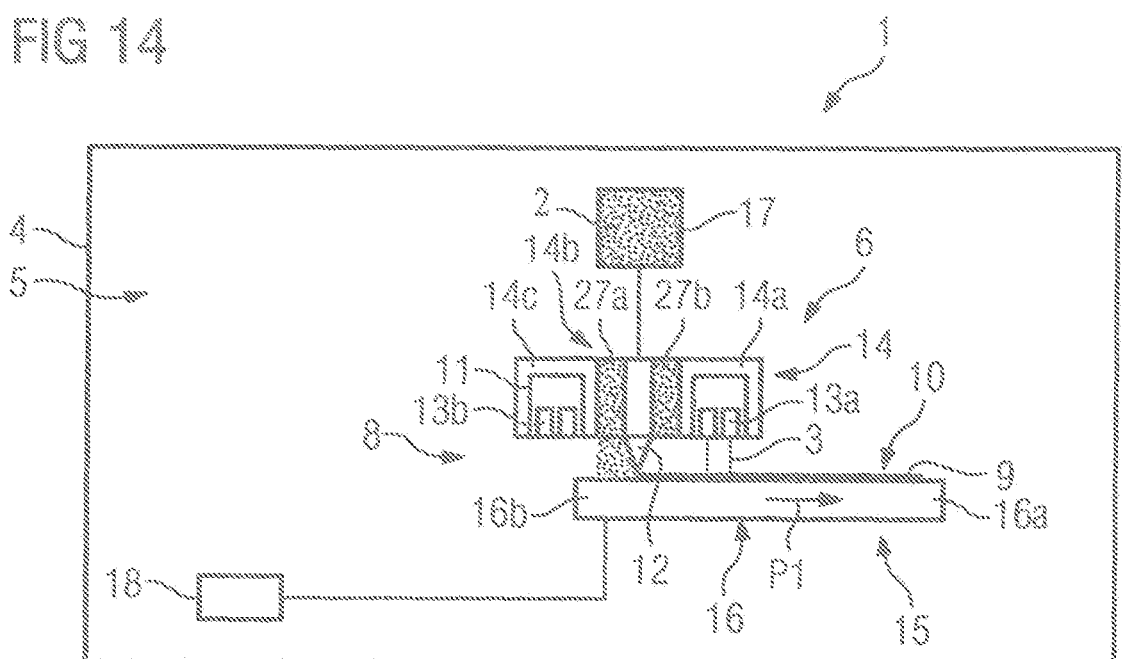

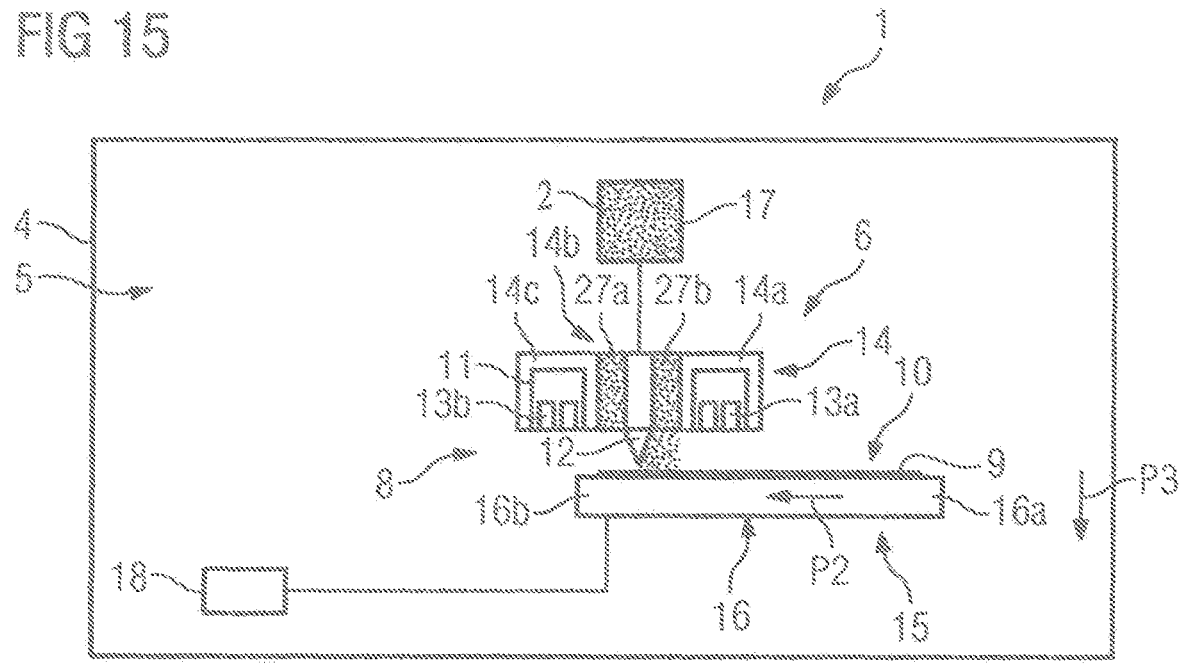
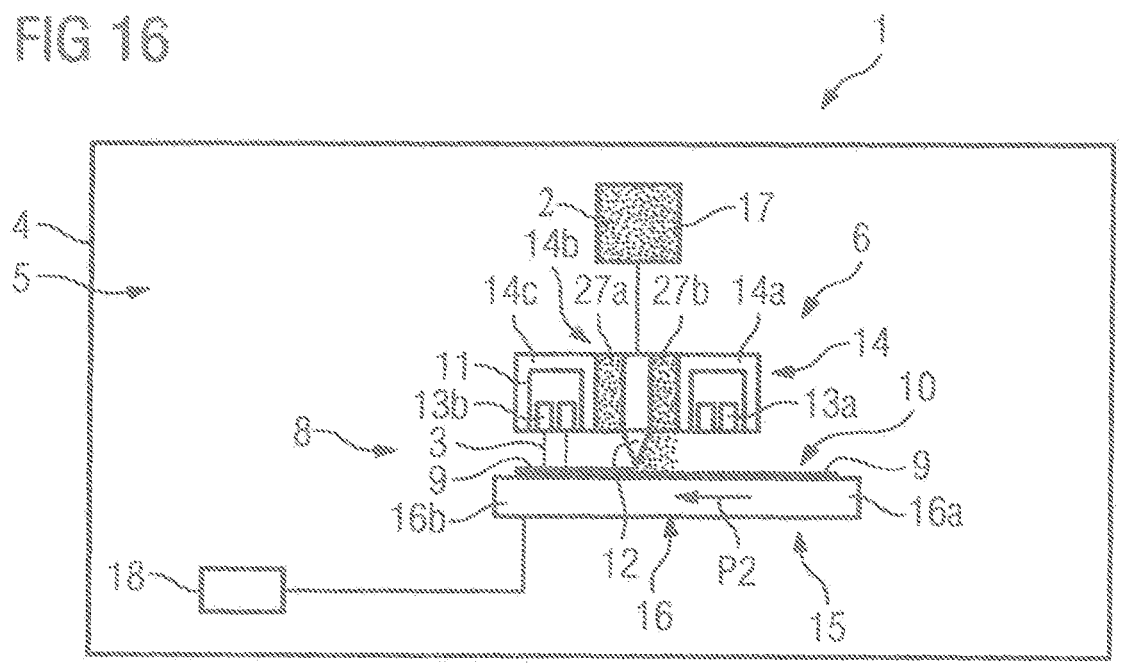

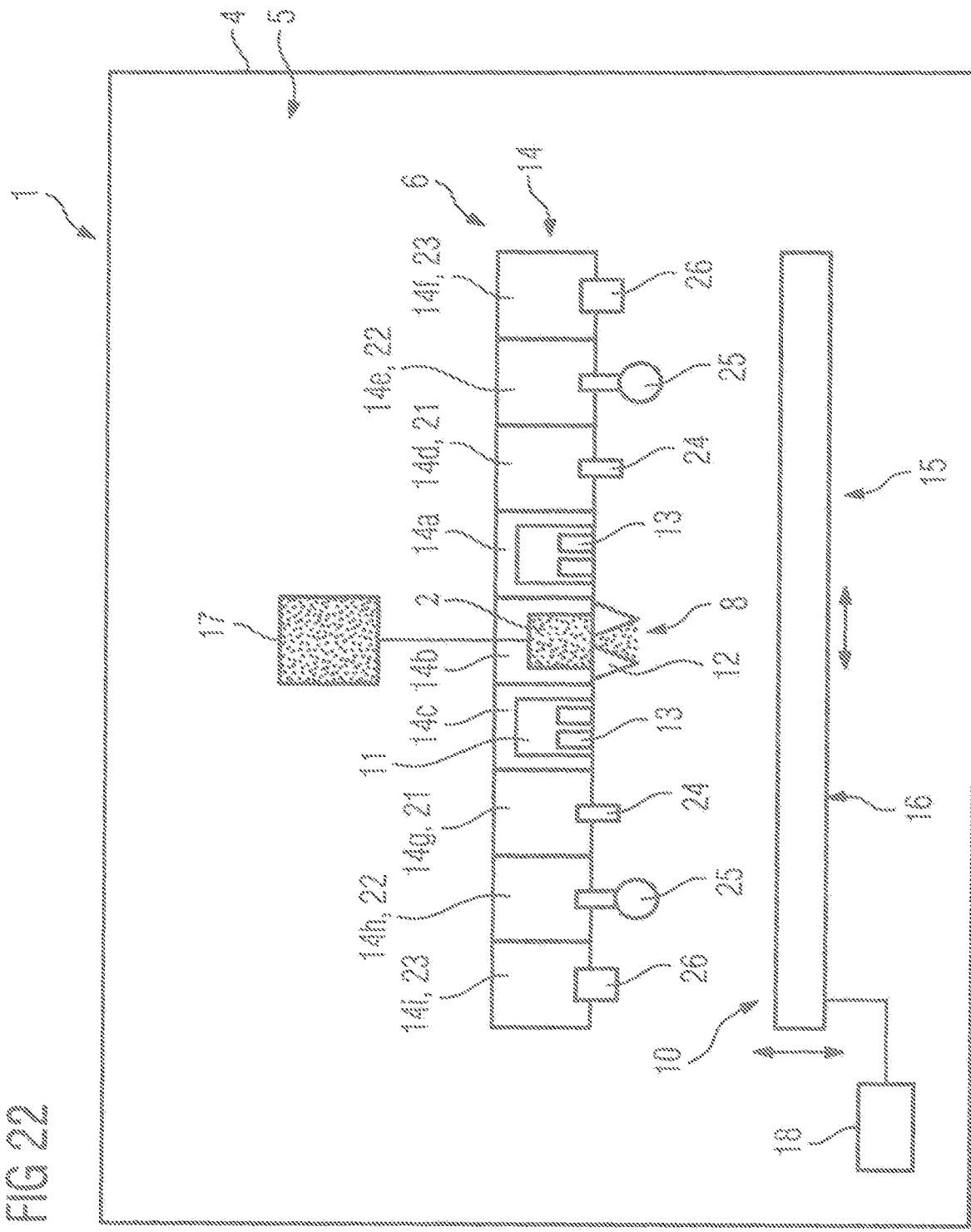

DEVICE FOR THE ADDITIVE PRODUCTION OF A THREE-DIMENSIONAL OBJECT

CROSS-REFERENCE TO RELATED APPLICATIONS

This application is a United States national stage entry of an International Application serial no. PCT/EP2017/054498 filed Feb. 27, 2017 which claims priority to German Patent Application serial no. 10 2016 105 097.0 filed Mar. 18, 2016. The contents of these applications are incorporated herein by reference in their entirety as if set forth verbatim.

The invention relates to an apparatus for additive manufacturing of a three-dimensional object by successive layerwise selective illumination and consequent selective solidification of construction material layers of solidifiable construction material, which are formed in a construction plane, by means of at least one energy beam.

Such apparatuses for additive or generative manufacturing of three-dimensional objects are known per se. By means of corresponding apparatuses, three-dimensional objects to be manufactured are constructed additively, or generatively, by successive layerwise selective illumination and consequent solidification of successive construction material layers of solidifiable construction material, which are applied in a construction plane, in respective regions corresponding to cross-sectional regions of the objects respectively to be produced, by means of an energy beam.

Because of their design configuration, known apparatuses require separate carrying out of coating and illumination processes; coating and illumination processes are therefore carried out chronologically separately from one another. These include, for example, apparatuses having an optionally movably mounted illumination device and a carrier device, which is arranged positionally fixed with respect thereto in the horizontal direction and comprises a carrying element comprising the construction plane. These apparatuses require further development with a view to reducing nonproductive times, or optimizing the construction time.

The object of the invention is to provide an apparatus which is improved in relation thereto, particularly with a view to reducing nonproductive times, or optimizing the construction time, for the additive manufacturing of a three-dimensional object.

The object is achieved by an apparatus as described herein. The claims relate to particular embodiments of the apparatus. The object is furthermore achieved by a method as described herein.

The apparatus described herein is used for additive or generative manufacturing of at least one three-dimensional object, i.e. for example a technical component or a technical component group, by successive layerwise selective illumination and consequent selective solidification of individual construction material layers of solidifiable construction material by means of at least one energy beam.

The solidifiable construction material may be a metal powder, plastic powder and/or ceramic powder. A metal powder, plastic powder or ceramic powder may also be understood as a powder mixture of different metals, plastics or ceramics, respectively. In the case of a metal powder, it may in this regard also be a powder of at least one metal alloy. The energy beam may be a laser beam. The apparatus may correspondingly be an apparatus for carrying out selective laser melting methods (abbreviated to SLM methods) or selective laser sintering methods (abbreviated to SLS methods).

The successive selective layerwise illumination and the consequent successive layerwise selective solidification of the construction material layers to be solidified in order to manufacture a three-dimensional object (referred to below as the "object" for brevity) is carried out on the basis of object-related construction data. The construction data describe the geometrical or geometry-design configuration of the object to be manufactured. The construction data may, for example, be or contain CAD data of the object to be manufactured.

The apparatus comprises all the functional component parts typically required in order to carry out additive construction processes. The functional component parts can be or are typically arranged in a housing structure of the apparatus, which may optionally also be referred to or considered as a machine housing.

The apparatus comprises at least one combined coating and illumination assembly (referred to below as an "assembly" for brevity). The assembly comprises a coating device. The coating device is configured in order to carry out material application processes for applying construction material onto the construction plane and in order to carry out coating processes for forming construction material layers to be selectively illuminated, or to be selectively solidified, in a construction plane. In a respective application process, a particular amount of construction material is applied onto the construction plane. In a respective coating process, a construction material layer to be selectively illuminated, or to be selectively solidified, with a defined layer thickness is typically formed from construction material applied onto the construction plane in the scope of an application process. The coating device comprises at least one application element, typically arranged above the construction plane and in particular comprising at least one application opening, which can typically be closed by a closure element that can be moved between an open and a closed position, for applying construction material onto the construction plane, and at least one, in particular a blade-like or blade-shaped, coating element ("coating blade"), typically arranged above the construction plane, for forming a construction material layer to be selectively illuminated, or to be selectively solidified, with a defined layer thickness.

Besides the coating device, the assembly comprises an illumination device. The illumination device is configured in order to carry out illumination processes for selective illumination and consequent selective solidification of construction material layers formed in the construction plane by means of the coating device. In a respective illumination process, a construction material layer formed by means of the coating device is typically illuminated selectively, and therefore solidified selectively. The illumination device may comprise one or more illumination element(s), typically arranged above the construction plane. An illumination element may be a laser diode element or an optical element, particularly in lens form, which can be or is coupled to a laser diode element, or a scanner element as part of an optical scanner device, also to be referred to or considered as a beam steering device, or a corresponding illumination element may comprise at least one of the elements mentioned. Because of the, optionally variable, beam properties of the laser beams which can be generated by them, illumination elements in the form of laser diode elements may be particularly expedient. As will be revealed below, laser diode elements, optionally combined in groups, may be arranged in a row and/or column fashion ("matrix fashion").

The assembly is arranged or configured statically, or fixed in position, i.e. not movably, on the housing structure of the apparatus. The assembly arranged or configured statically on the housing structure of the apparatus, or the coating device and illumination device associated therewith, therefore lies in a defined position, i.e. in particular at a defined distance, and a defined orientation relative to the construction plane. Static arrangement or configuration of the assembly does not exclude the possibility that the assembly may when required be separated from the housing structure, for example for service and/or repair purposes. The assembly can therefore be fastened releasably to the housing structure, the assembly being mounted statically, i.e. not movably, relative to the construction plane in the state fastened to the housing structure.

The apparatus furthermore comprises at least one carrying device. The carrying device comprises at least one carrying element which comprises the construction plane, i.e. the plane in which corresponding coating and illumination processes are carried out. The carrying element, which typically has a plate-like or plate-shaped geometrical configuration, is mounted movably in a horizontally oriented movement plane, or movement path, relative to the assembly. The respective movements of the carrying element in the horizontally oriented movement plane, or movement path, are typically linear movements along a linear movement axis (translation axis).

In order to carry out respective movements of the carrying element in the horizontally oriented movement plane relative to the assembly, various methods are in principle possible.

In a first variant, the carrying element may be arranged or configured on or in a movably mounted modular housing structure of the carrying device. In the first variant, the modular housing structure is mounted movably in the horizontally oriented movement plane relative to the assembly. In this case, it is thus not the carrying element itself, but the entire modular housing structure, on or in which the carrying element is arranged or configured, that is mounted movably in the horizontal direction relative to the module. Movements of the carrying element relative to the assembly therefore result from movements of the modular housing structure relative to the assembly. The carrying element is arranged or configured statically, at least in the horizontal direction, on or in the modular housing structure.

In a further variant, the carrying element may be arranged or configured in a modular housing structure, arranged or configured statically relative to the assembly, of the carrying device. In the further variant, the carrying element is mounted on or in the housing structure movably in the horizontally oriented movement plane relative to the assembly. In this case, it is thus the carrying element itself that is mounted movably in the horizontal direction relative to the assembly. Movements of the carrying element relative to the assembly therefore result from actual movements of the carrying element relative to the modular housing structure. The modular housing structure is arranged or configured statically, at least in the horizontal direction, on or in the housing structure of the apparatus.

In principle, a combination of the two variants mentioned above is also possible.

In principle, it is the case that the modular housing structure of the carrying device can be removed in the manner of a replaceable container from the housing structure of the apparatus. The carrying structure can therefore be removed when required from the housing structure of the apparatus, and fastened when required on the housing structure of the apparatus.

For driving, i.e. for setting the carrying element or the modular housing structure of the carrying device in a movement in the horizontally oriented movement plane relative to the assembly, the apparatus typically comprises at least one drive device.

In respect of the first variant, it is the case that the apparatus comprises at least one drive device, which can be or is coupled to the modular housing structure of the carrying device and is configured in order to generate a drive force which moves the modular housing structure of the carrying device in the horizontally oriented movement plane relative to the assembly.

Besides at least one (electric) motor drive unit, by means of which the actual drive force can be generated, the drive device may comprise at least one transmission unit coupled thereto, by means of which the generated drive force can be transmitted to the element to be driven, i.e. the modular housing structure or the carrying element. The drive device may be configured as a linear drive, or comprise at least one such drive. Specifically, the drive device may be configured for example as a crank drive or spindle drive, or comprise such a drive. In order to be able to produce a guided movement of the modular housing structure in the horizontal movement plane, or movement path, guide devices, for example rail-like guide devices, may be arranged or configured on or in the housing structure of the apparatus.

In respect of the second variant, it is correspondingly the case that the apparatus comprises at least one drive device, which can be or is coupled to the carrying device and is configured in order to generate a drive force which moves the carrying element in the horizontally oriented movement plane relative to the assembly. Besides at least one (electric) motor drive unit, by means of which the actual drive force can be generated, the drive device may in this case also comprise at least one transmission unit coupled thereto, by means of which the generated drive force can be transmitted to the element to be driven, i.e. the modular housing structure or the carrying element. The drive device may in this case also be configured as a linear drive, or comprise such a drive. Specifically, a drive device may be configured for example as a crank drive or spindle drive, or comprise such a drive. In order to be able to carry out a guided movement of the carrying structure in the horizontal movement plane, or movement path, guide devices, for example rail-like guide devices, may be arranged or configured on or in the modular housing structure. The guide devices may be mounted movably in the vertical direction, in order to carry out lowering of the carrying element.

Besides the described mobility in a horizontal movement plane, or movement path, the carrying element may thus furthermore be mounted movably relative to the assembly in at least one further movement plane, or movement path. Such a further movement plane, or movement path, is typically oriented vertically. Respective movements of the carrying element in the vertically oriented movement plane, or movement path, are typically linear movements along a linear movement axis (translation axis) which are characteristic of corresponding additive manufacturing methods after a coating and illumination process has been carried out. In respect of the drive devices required for the movement of the carrying element in the vertically oriented movement plane, the comments relating to the movement of the carrying element relative to the assembly in the horizontally oriented movement plane apply analogously.

The design configuration of the apparatus described herein allows movement of a carrying element, which comprises the construction plane, relative to a combined coating and illumination device. The movement of the carrying element relative to the assembly takes place in a horizontal movement plane, or movement path; the carrying element can therefore be moved to and fro in a similar way to the principle of a plotter. What is essential in this case is that, as will be explained in more detail below, both coating and illumination process can be carried out during respective movements of the carrying element relative to the assembly. Movement of the carrying element relative to the assembly therefore allows formation, at least in sections, in particular fully, of a defined construction material layer and selective illumination, at least in sections, in particular fully, of the construction material layer formed. The coating and the illumination are in this case respectively carried out during the horizontal movement of the carrying element relative to the assembly. The apparatus therefore allows simultaneous conduct of coating and illumination processes, so that down times or nonproductive times can be reduced, possibly even eliminated, and construction times can correspondingly be optimized.

By the static arrangement or configuration of the assembly, i.e. of the coating and illumination device, adjustment processes of these devices are furthermore simplified since the assembly typically can be or is arranged in "only" one defined position and orientation relative to the construction plane. The position and orientation of the assembly relative to the construction plane are optimized in relation to the coating device, so that the construction material layer that can be formed by means of respective coating elements has desired layer properties, in particular a desired layer thickness. The position and orientation of the assembly relative to the construction plane are furthermore optimized in relation to the illumination device, so that the energy beam that can be generated by means of respective illumination elements strikes a construction material layer respectively to be selectively illuminated, or solidified, with desired beam properties, i.e. for example a desired intensity. The assembly typically only needs to be adjusted once in order to be positioned, or oriented, exactly relative to the construction plane.

Overall, an apparatus for the additive manufacturing of three-dimensional objects is provided, which is improved in particular in relation to reduction or optimization of the construction time.

The static arrangement or configuration of the assembly on the housing structure of the apparatus may be carried out using a reception structure, which is fastened on the housing structure and in which at least the assembly, i.e. the coating device and the illumination device, is arranged or configured in a structurally integrated way. Arrangement or configuration of the coating device and of the illumination device in the reception structure leads to a structurally compact configuration of the assembly. Fastening of the reception structure on the housing structure of the apparatus leads to exact positioning and orientation of the coating device and of the illumination device relative to the construction plane. To this end, the reception structure may be equipped with suitable fastening elements which are configured in order to fasten the reception structure, for example with a form and/or force fit, on suitable counter-fastening elements of the housing structure of the apparatus. Corresponding fastening elements may be force-fit elements, i.e. for example bolt-like threaded elements, which allow force-fit fastening of the reception structure on suitable counter-fastening elements, i.e. for example threaded bores, of the housing structure of the apparatus. Of course, a reversed configuration is likewise possible.

The reception structure may comprise separate reception compartments for receiving functional elements associated with the coating device, i.e. for example respective application elements and respective, in particular blade-like or blade-shaped, coating elements, and for receiving functional elements associated with the illumination device, i.e. for example respective illumination elements, in particular configured as laser diode elements. There may also be separate reception compartments for respective application, coating and illumination elements, which is useful for the aforementioned exact positioning and orientation of the coating device and of the illumination device relative to the construction plane.

Functional elements of further functional component parts of the apparatus may additionally be arranged or configured in the reception structure, i.e. in respective reception compartments provided therefor. Individual, several or all of the functional elements of further functional component parts of the apparatus may thus be arranged or configured in a structurally integrated way in the reception structure, in addition to the functional elements of the assembly. Corresponding arrangement or configuration of respective functional elements of further functional component parts of the apparatus likewise requires that these further functional elements be arranged or configured statically on the housing structure of the apparatus.

A further functional component part of the apparatus, arranged or configured in a (further) reception compartment of the reception structure and therefore arranged or configured statically on the housing structure of the apparatus, may for example be a suction device which is configured for suction of construction material detached from a construction material layer as a result of the construction process ("weld splashes") and/or for suction of process gases produced as a result of the construction process. The suction device comprises at least one suction element, by means of which a suction flow can be formed which allows for removal of construction material detached from a construction material layer as a result of the construction process and/or for suction of process gases produced as a result of the construction process. It may be possible that a suction flow can flow or flows through the suction element, and that the latter is correspondingly coupled to a flow generating device, i.e. for example a pump device. At least one passage opening for passage of an energy beam generated by the illumination device may be formed in the suction element. The suction element may have an elongate, in particular tube-like, optionally funnel-shaped, geometrical configuration.

A further functional component part of the apparatus, arranged or configured in a (further) reception compartment of the reception structure and therefore arranged or configured statically on the housing structure of the apparatus, may (as an alternative or in addition) for example be a smoothing and/or planarizing device which is configured for smoothing and/or planarization, at least in sections, of a selectively solidified construction material layer. The smoothing and/or planarizing device comprises at least one smoothing and/or planarizing element, by means of which it can act on a selectively solidified construction material layer in order to remove nonuniformities produced as a result of the construction process in the construction material layer, i.e. for example crater-like elevations, in the construction material layer, i.e. smooth or planarize the construction material layer before a further construction material layer is formed thereon. The smoothing and/or planarizing element may for example be configured as a scraper or as grinding element which can optionally be driven in rotation ("grinding roller").

A further functional component part of the apparatus, arranged or configured in a (further) reception compartment of the reception structure and therefore arranged or configured statically on the housing structure of the apparatus, may (as an alternative or in addition) for example be a detection device, which is configured in order to detect at least one detection variable describing the quality of a construction material layer which is to be solidified and/or has been selectively solidified, i.e. in particular its surface. The detection device comprises at least one detection element, by means of which image data of a construction material layer which is to be solidified and/or has been selectively solidified can be recorded. The detection element may for example be configured as an optical imaging element, in particular a camera. Recorded image data can be evaluated qualitatively or quantitatively for particular detection variables describing the quality of the construction material layer by means of suitable evaluation algorithms. Corresponding detection variables may be features which influence the quality of the construction material layer, i.e. for example nonuniformities, for example crater-like elevations, irregularities, etc., of a construction material layer. The recorded, and optionally correspondingly evaluated, image data can be visualized by means of suitable visualization algorithms, so that a two- or three-dimensional (topological) image, in particular of the surface, of a construction material layer can be compiled and displayed on a suitable display device, which optionally forms a constituent part of the apparatus.

Respective reception compartments of the reception structure may be connectable or connected to one another releasably (without damage or destruction) so as to form the reception structure, particularly in the horizontal direction. The reception structure may therefore be assembled according to requirements from individual reception compartments which can be connected to one another, and can therefore for be made larger or smaller according to requirements. To this end, suitable connecting elements are arranged or configured on respective reception compartments, by means of the interactions of which elements a releasable e.g. form-fit and/or force-fit connection of a plurality of reception compartments on one another or to one another may be formed. Corresponding connecting elements may be form-fit elements, i.e. for example latching projections, or force-fit elements, i.e. for example bolt-like threaded elements, which allow form-fit or force-fit fastening of a reception compartment on suitable form-fit counter-elements, i.e. for example latching recesses, or on suitable force-fit counter-elements, i.e. for example threaded bores, of a further reception compartment.

The illumination device may comprise a plurality of illumination elements, in particular combined in a plurality of groups, these elements respectively being configured for generating an energy beam for selective illumination of a construction material layer to be selectively solidified. The coating device may be arranged or configured between a first number of illumination elements, in particular a first group of a plurality of illumination elements, and a second number of illumination elements, in particular a second group of a plurality of illumination elements. Such an arrangement of the coating device between respective illumination elements of the illumination device is expedient for the aforementioned conduct of simultaneous coating and illumination processes during movement of the carrying element relative to the assembly. The arrangement may be structurally implemented in such a way that a first number of illumination elements, in particular a first group of illumination elements, is arranged or configured on a first side region of the coating device, and a second number of illumination elements, in particular a second group of illumination elements, is arranged or configured on a second side region of the coating device, in particular lying opposite the first side region. Such an arrangement may of course be produced using corresponding reception compartments, so that a first number or group of illumination elements are arranged or configured in a first reception compartment, at least one application element and at least one coating element are arranged or configured in a second reception compartment arranged next to the first reception compartment, and a second number or group of illumination elements are arranged or configured in a third reception compartment next to the second reception compartment.

The coating device in this case comprises in principle at least one application element and at least one coating element. In respect of the arrangement and number of respective application and coating elements, there are various configuration possibilities of the coating device:

According to a first exemplary configuration, the coating device may comprise a plurality of coating elements arranged (directly) next to one another, and an optionally single application element. The application element may be configured in order to apply a particular amount of construction material between at least two coating elements onto the construction plane. The application element is therefore arranged relative to the coating elements in such a way that it can apply construction material into an intermediate space formed by at least two coating elements arranged directly next to one another. The coating elements may be mounted movably, for example in the vertical direction, between a coating position in which the formation of a defined or desired construction material layer is possible, and a noncoating position in which the formation of a defined or desired construction material layer is not possible. Typically in every case a coating element is moved into the coating position and a coating element is moved into the noncoating position in an alternating sequence.

According to a second exemplary configuration, the coating device may comprise a plurality of application elements arranged next to one another and a (single) coating element. The application elements may be configured in order to apply a particular amount of construction material laterally next to the coating element, which is typically arranged or configured centrally between respective application elements, onto the construction plane. A first application element or a group of first application elements may be arranged or configured to the left of coating element, and a second application element or a group of second application elements may be arranged or configured to the right of the coating element.

For either configuration, it is the case that the application coating elements—in a similar way to the illumination elements—typically can be or are arranged in a defined position and orientation, in particular at a defined distance, relative to the carrying element, in order to form a defined construction material layer.

In connection with the mentioned simultaneous conduct of coating and illumination processes, it is expedient for the carrying element to be mounted movably between a first position in which a first carrying element section, in particular a carrying element section forming a first end of the carrying element, is arranged below the coating device, and a second position in which a second carrying element section, in particular a carrying element section forming a second end of the carrying element, is arranged below the coating device.

On the basis of the first exemplary configuration of the coating device—applicable for the case in which respective application and coating elements associated with the coating device are arranged or configured between a first number of illumination elements, in particular a first group of illumination elements, and a second number of illumination elements, in particular a second group of illumination elements—the formation of a construction material layer during movement of the carrying element starting from the first position in the direction of the second position may be carried out by means of a first coating element. The application of construction material between the coating elements is carried out by means of a correspondingly arranged application element. In this case, the illumination of the construction material layer which has been formed, during the movement of the carrying element in the direction of the second position, may be carried out by means of at least one illumination element associated with the first number. In a similar way, the formation of a construction material layer during movement of the carrying element starting from the second position in the direction of the first position may be carried out by means of a second coating element. The application of construction material between the coating elements is again carried out by means of a correspondingly arranged application element. The illumination of the construction material layer which has been formed may be carried out during the movement of the carrying element in the direction of the first position by means of at least one illumination element associated with the second number.

On the basis of the second exemplary configuration of the coating device—applicable for the case in which respective application and coating elements associated with the coating device are arranged or configured between a first number of illumination elements, in particular a first group of illumination elements, and a second number of illumination elements, in particular a second group of illumination elements—the application of construction material onto the construction plane during movement of the carrying element starting from the first position in the direction of the second position may be carried out by means of a first application element. The formation of the construction material layer is carried out by means of a coating element arranged (centrally) between the application elements. Illumination of the construction material layer formed by means of the coating element may be carried out during the movement of the carrying element in the direction of the second position by means of at least one illumination element associated with the first number. The application of construction material onto the construction plane may be carried out during movement of the carrying element starting from the second position in the direction of the first position by means of a second application element. The formation of the construction material layer is again carried out by means of a coating element arranged (centrally) between the application elements. The illumination of the construction material layer formed by means of the coating element may be carried out during the movement of the carrying element in the direction of the first position by means of at least one illumination element associated with the second number.

In respect of an exemplary plate-like or plate-shaped geometrical configuration of the carrying element, in the first position a left end region of carrying element may be arranged below the coating device. In the second position, a right end region of the carrying element may be arranged below the coating device. The movement of a carrying element lying in the first position therefore takes place to the left, in order to move the carrying element into the second position. Correspondingly, the movement of a carrying element lying in the second position therefore takes place to the right, in order to move the carrying element into the first position.

Overall, an application process, a coating process and an illumination process may be carried out during each horizontal movement of the carrying element relative to the assembly, i.e. independently of whether it is being moved in the direction of the first or second position ("plotter principle").

Individual, several or all of the illumination elements may be arranged or configured on the reception structure in such a way that they can be moved in at least one movement degree of freedom relative to the construction plane. By movable mounting of respective illumination elements, it is possible to produce different illumination profiles, by means of which various solidification parameters, for example solidification degrees, of a construction material layer to be solidified may be varied. Temperature control of a construction material layer to be or which has been solidified, may also be envisioned by means of correspondingly configured illumination elements. Movements of an illumination element may involve translational movement degrees of freedom along at least one translation axis and/or rotational movement degrees of freedom about at least one rotation axis. Movement of an illumination element may therefore involve a linear movement along a linear movement axis (translation axis) and/or a revolving movement about an axis of revolution (rotation axis). Of course, individual, several or all of the illumination elements may be movable in combination in different movement degrees of freedom. In a similar way, corresponding illumination elements may also be arranged or configured on the reception structure so that they can be moved in at least one movement degree of freedom relative to the construction plane. In this way, the aforementioned movable mounting of a coating element between the aforementioned coating position and the aforementioned noncoating position may be produced.

The apparatus may comprise a storage device, which is or can be assigned to the coating device, in particular respective application elements. The storage device is configured in order to store construction material. The storage device can be or is connected to the coating device, in particular respective application elements, in such a way that a particular amount of construction material can be delivered discontinuously or continuously by means of the storage device. The amount of construction material delivered to the coating device is expediently adapted to the movement of the carrying element, i.e. in particular the speed of the carrying element, relative to the assembly. To this end, the storage device may be connected to a data memory device in which particular movement profiles, in particular speed profiles, of the carrying element relative to the assembly are stored as data.

The carrying element, optionally the entire carrying device, expediently is vibrationally decoupled from the housing structure of the apparatus. This prevents the introduction of vibrations generated on during movements of the carrying element relative to the assembly, and consequent possible impairment of illumination processes. The vibrational decoupling is carried out by means of suitable decoupling elements or structures, i.e. for example elastomer elements or structures, connected between the carrying element or the carrying device and the assembly.

The invention furthermore relates to a method for additive manufacturing of at least one three-dimensional object by successive layerwise selective illumination and consequent solidification of individual construction material layers of solidifiable construction material by means of at least one energy beam. The method may be a selective laser melting method (SLM method) or a selective laser sintering method (SLS method). The method is distinguished in that an apparatus as described for additive manufacturing of at least one three-dimensional object is used. All comments relating to the apparatus therefore apply similarly for the method.

The invention is explained in more detail with reference to exemplary embodiments in the figures of the drawing, in which:

FIG. 1-22 each show a schematic representation of an apparatus for additive manufacturing of a three-dimensional object according to one exemplary embodiment.

FIG. 1 shows a schematic representation of an apparatus 1 according to one exemplary embodiment. The apparatus 1 serves for additive manufacturing of a three-dimensional object, i.e. for example of a technical component or a technical component group, by successive layerwise selective illumination and consequent solidification of construction material layers 9 of a solidifiable construction material 2 by means of at least one energy beam 3. The successive layerwise selective solidification of respective construction material layers 9 to be solidified is carried out by one or more energy beams 3 being directed selectively onto particular regions corresponding to respective layer-related cross-sectional geometries of the object to be produced, of respective construction material layers 9 ("selective illumination").

The solidifiable construction material 2 is for example a metal powder (mixture), i.e. for example an aluminum powder (mixture) or steel powder (mixture). The energy beam 3 is for example a laser, and the apparatus 1 is therefore configured in order to carry out selective laser melting methods or selective laser sintering methods.

The apparatus 1 comprises a housing structure 4, in which the functional component parts of the apparatus 1, which are required in order to carry out additive construction processes, are arranged or configured. The housing structure 4 comprises an inertable process chamber 5. A protective gas atmosphere, i.e. for example an argon or nitrogen atmosphere, and/or a particular pressure level can be formed and maintained in the process chamber 5.

The apparatus 1 comprises at least one combined coating and illumination assembly 6, referred to below as an "assembly" for brevity. The assembly 6 comprises a coating device 8 and an illumination device 11.

The coating device 8 is configured in order to carry out coating processes in order to form construction material layers 9 to be selectively illuminated, or to be selectively solidified, in the construction plane 10, i.e. the plane in which corresponding coating and illumination processes are carried out. A construction material layer 9 to be selectively illuminated and/or selectively solidified is formed in a respective coating process. The coating device 8 comprises one or more application elements 27, 27a, 27b arranged or configured above the construction plane 10, optionally in a (parallel) arrangement and orientation next to one another, and comprising at least one application opening (not represented in detail), which can typically be closed by means of a closure element (not represented in detail) which can be moved between an open position and a closed position, as well as one or more blade-like or blade-shaped coating elements 12, optionally in a (parallel) arrangement and orientation next to one another.

A storage device 17 is assigned to the coating device 8, or the respective application elements 27, 27a, 27b. The storage device 17 is configured in order to store construction material 2. The storage device 17 is connected to the coating device 8, or to the respective application elements 27, 27a, 27b, in such a way that a particular amount of construction material 2 can be delivered discontinuously or continuously by means of the storage device 17. The amount of construction material 2 delivered to the coating device 8 may be adapted to the movement (explained below) of the carrying element 16 of a carrying device 15, i.e. in particular the speed of the carrying element 16, relative to the assembly 6.

The illumination device 11 is configured in order to carry out illumination processes for selective illumination and consequent selective solidification of construction material layers 9 formed in the construction plane 10 by means of the coating device 8. In a respective illumination process, a construction material layer 9 formed by means of the coating device 8 is selectively illuminated and therefore selectively solidified. The illumination device 11 comprises a plurality of illumination elements 13 arranged or configured above the construction plane 10. The illumination elements 13 are configured as laser diode elements. It would also be conceivable for the illumination elements 13 to be optical elements, particularly in lens form, coupled to laser diode elements (not shown), for example arranged outside the housing structure 4, or to be scanner elements as part of an optical scanner device.

The assembly 6 is arranged or configured statically, or fixed in position, i.e. not movably, on the housing structure 4, i.e. typically on a wall associated with the housing structure 4 or on a fastening device (not shown) arranged or configured on a wall associated with the housing structure 4. The coating device 8, or the application elements 27 and coating elements 12 associated therewith, as well as the illumination device 11, or the illumination elements 13 associated therewith, therefore lie in a defined position, i.e. in particular at a defined distance, and a defined orientation relative to the construction plane 10. The static arrangement of the assembly 6 on the housing structure 4 does not exclude the possibility that the assembly 6 may when required be separated from the housing structure, for example for service and/or repair purposes. The assembly 6 may therefore be fastened releasably (without damage or destruction) on the housing structure 4.

The static arrangement, or configuration, of the assembly 6 on the housing structure 4 is produced using a reception structure 14, which is fastened on the housing structure 4 and in which the coating device 8 and the illumination device 11 are structurally integrated. Arrangement of the coating device 8 and of the illumination device 11 in the reception structure 14 gives rise to a structurally compact configuration of the assembly 6, as well as to exact positioning and orientation of the coating device 8, or of the application and coating elements 12, 27, and of the illumination device 11, or of the illumination elements 13, relative to the construction plane 10. In order to fasten it on the housing structure 4, the reception structure 14 is equipped with fastening elements (not represented in detail) which are configured in order to fasten the reception structure 4, for example with a form and/or force fit, on suitable counter-fastening elements (not represented in detail) of the housing structure 4. Corresponding fastening elements may be force-fit elements, i.e. for example bolt-like threaded elements, which allow force-fit fastening of the reception structure 4 on suitable counter-fastening elements, i.e. for example threaded bores, of the housing structure 4.

The reception structure 14 comprises separate reception compartments 14a, 14b, 14c for receiving the application and coating elements 12, 27 associated with the coating device 8 and for receiving the illumination elements 13 associated with the illumination device 11. Respective reception compartments 14a-14c may be connected to one another releasably (without damage or destruction) so as to form the reception structure 14, particularly in the horizontal direction. The reception structure 14 may therefore be assembled according to requirements from individual reception compartments 14a-14c, and can therefore be made larger or smaller according to requirements. To this end, suitable connecting elements (not represented in detail) are arranged or configured on the reception compartments 14a-14c, by means of the interactions of which elements a releasable e.g. form-fit and/or force-fit connection of a plurality of reception compartments 14a-14c on one another or to one another may be formed. Corresponding connecting elements may be form-fit elements, i.e. for example latching projections, or force-fit elements, i.e. for example bolt-like threaded elements, which allow form-fit or force-fit fastening of a reception compartment 14a-14c on suitable form-fit counter-elements, i.e. for example latching recesses, or on suitable force-fit counter-elements, i.e. for example threaded bores, of a further reception compartment 14a-14c.

The arrangement of the application and coating elements 12, 27, and of the illumination elements 13, in respective reception compartments 14a-14c is selected in such a way that the application and coating elements 12, 27 are arranged between a first number of illumination elements 13, i.e. a first group of a plurality of illumination elements 13, and a second number of illumination elements 13, i.e. a second group of a plurality of illumination elements 13. The arrangement is structurally implemented in such a way that a first group of illumination elements 13 is arranged in a first reception compartment 14a, the application and coating elements 12, 27 are arranged in at least one second (further) reception compartment 14b arranged next to the first reception compartment 14a, and a second group of illumination elements 13 is arranged in a third (further) reception compartment 14c next to the second reception compartment 14b.

The apparatus 1 furthermore comprises a carrying device 15. A plate-like or plate-shaped carrying element 16, which comprises the construction plane 10, is associated with the carrying device 15. Before the start of an additive construction process, the construction plane 10 is typically formed by the surface, or upper side, of the carrying element 16 facing toward the assembly 6. The carrying element 16 is—as indicated by the horizontally oriented double arrow—mounted movably in a horizontally oriented movement plane, or movement path, relative to the assembly 6. Movements of the carrying element 16 in the horizontally oriented movement plane, or movement path, are linear movements along a linear movement axis (translation axis).

The carrying element 16 is—as indicated by the vertically oriented double arrow—also mounted movably in a vertical movement plane, or movement path, relative to the assembly 6, besides the mobility in the horizontal movement plane, or movement path. Respective movements of the carrying element 16 in the vertically oriented movement plane, or movement path, are typically linear movements along a linear movement axis (translation axis), which are characteristic of corresponding additive manufacturing methods after a coating and illumination process has been carried out.

Movements of the carrying element 16 in the horizontal and/or vertical movement plane, or movement path, are carried out by means of one or more drive devices 18, which can be or are coupled to the carrying element 16 and which will be discussed in more detail below.

The design configuration of the apparatus 1 allows movement of the carrying element 16 relative to the assembly 6 in a horizontal movement plane, or movement path; with the aid of FIGS. 2 to 10 and FIGS. 11-20, it can be seen that the carrying element 16 can be moved to and fro in a similar way to the principle of a plotter in the horizontal movement plane relative to the assembly 6. During respective movements of the carrying element 16 relative to the assembly 6, both coating processes and illumination processes may be carried out. Movements of the carrying element 16 relative to the assembly 6 therefore allow both the application of construction material 2, the formation of a defined construction material layer 9, and selective illumination of the construction material layer 9 which has been formed. The application, coating and illumination are thus respectively carried out during the horizontal movement of the carrying element 16 relative to the assembly 6. The apparatus 1 therefore allows simultaneous conduct of application, coating and illumination processes, so that down times or nonproductive times can be reduced, possibly even eliminated, and construction times can correspondingly be optimized.

The simultaneous conduct of application, coating and illumination processes will first be explained in more detail below with reference to the schematic representations shown in FIGS. 2-10. Here, a first exemplary configuration of the coating device 8 with a plurality of coating elements 12a, 12b arranged (directly) next to one another and an application element 27 is shown. The application element 27 is configured in order to apply a particular amount of construction material between the coating elements 12a, 12b onto the construction plane 10.

The application element 27 is therefore arranged relative to the coating elements 12a, 12b in such a way that it can apply construction material 2 into an intermediate space formed by the coating elements 12a, 12b arranged directly next to one another. The coating elements 12a, 12b may be mounted movably by means of suitable drive devices (not shown), for example in the vertical direction, between a coating position in which the formation of a defined or desired construction material layer 9 is possible, and a noncoating position in which the formation of a defined or desired construction material layer 9 is not possible. Typically in every case a coating element 12a, 12b is moved into the coating position and a coating element 12a, 12b is moved into the noncoating position in an alternating sequence.

Figure 10:
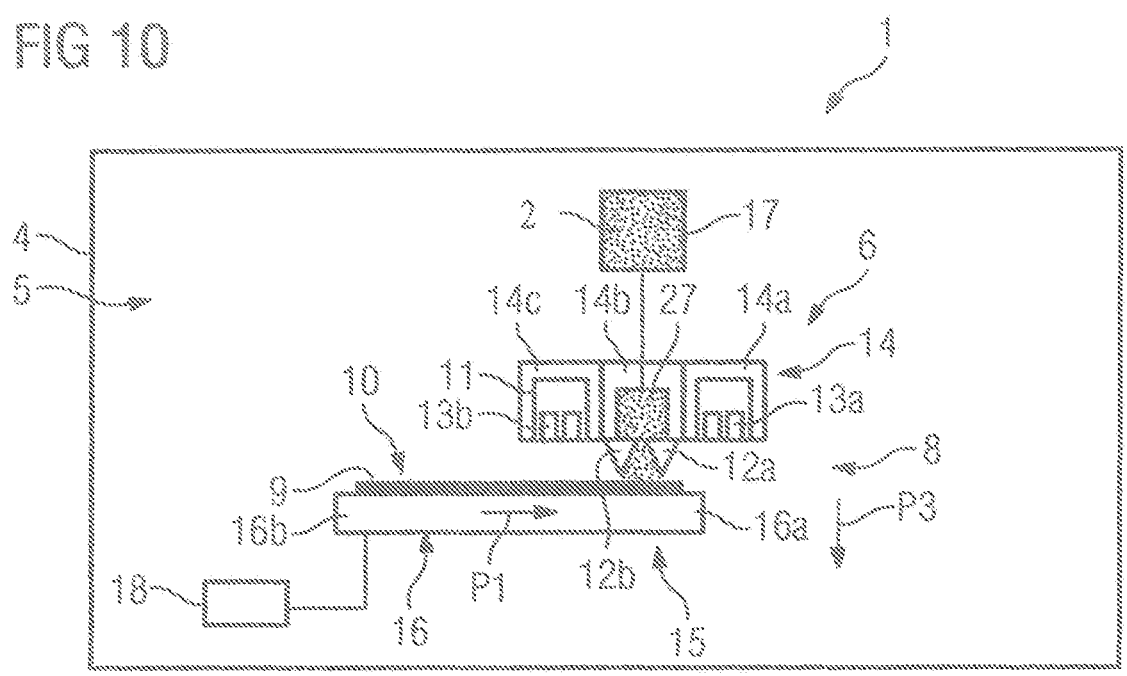

The carrying element 16 is mounted movably between a first position (cf. FIG. 2) in which a first carrying element section 16a, i.e. for example a carrying element section 16a forming a first end region (right end region) of the carrying element 16, is arranged below the coating device 8, or the application element 27, and a second position (cf. FIG. 6) in which a second carrying element section 16b, i.e. for example a carrying element section 16b forming a second end region of the carrying element 16, is arranged below the coating device 8, or the application element 27. In order to move the carrying element 16 lying in the first position into the second position, a horizontal movement of the carrying element 16 to the right is carried out. Horizontal movement of the carrying element 16 in the direction of the second position is indicated by the arrow P1 shown in FIGS. 2-6. Conversely, a horizontal movement of the carrying element 16 to the left is carried out in order to move the carrying element 16 lying in the second position into the first position. Horizontal movement of the carrying element 16 in the direction of the second position is indicated by the arrow P2 shown in FIGS. 6-10. In FIG. 10, the carrying element 16 is moved (back) into the first position. Of course, the first and second positions may be interchanged; the comments above apply similarly.

On the basis of the configuration represented, in which the application element 27 and the coating elements 12a, 12b are arranged between the first group of illumination elements 13a (FIGS. 2-10, to the right of the coating device 8) and the second group of illumination elements 13b (FIGS. 2-10, to the left of the coating device 8), the formation of a construction material layer 9 is carried out during movement (cf. arrow P1) of the carrying element 16 starting from the first position (cf. FIG. 2) in the direction of the second position (cf. FIG. 6) by means of a first (right) coating element 12a. The application of construction material 2 into the intermediate space formed between the coating elements 12a, 12b is carried out by means of the application element 27. In this context, FIGS. 2-6 are to be considered, with the aid of which the horizontal movement of the carrying element 16 in the direction of the arrow P1 starting from the first position, shown in FIG. 2, into the second position, shown in FIG. 6, can be seen. The selective illumination of the construction material layer 9 which has been formed, during the movement of the carrying element 16 in the direction of the second position, is carried out by means of the (right) illumination elements 13a associated with the first group. In a similar way, the formation of a further construction material layer 9 during movement of the carrying element 16 starting from the second position (cf. FIG. 6) in the direction of the first position (cf. FIGS. 2, 10) is carried out by means of a second coating element 12b. In this context, FIGS. 6-10 are to be considered, with the aid of which the horizontal movement of the carrying element 16 in the direction of the arrow P2 starting from the second position, shown in FIG. 6, (back) into the first position, shown in FIGS. 2, 10, can be seen. The selective illumination of the construction material layer 9 which has been formed, during the movement of the carrying element 16 in the direction of the first position, is carried out by means of the (left) illumination elements 13b associated with the second group.

The simultaneous conduct of application, coating and illumination processes will also be explained in more detail below with reference to the schematic representations shown in FIGS. 11-19. Here, a second exemplary configuration of the coating device 8 with a plurality of application elements 27a, 27b arranged next to one another and a single coating element 12 arranged centrally between the application elements 27a, 27b is shown. A first application element 27a is arranged to the left of the coating element 12, and a second application element 27b is arranged to the right of the coating element 12. The application elements 27a, 27b are respectively configured in order to apply a particular amount of construction material laterally next to the coating element 12, arranged centrally between the application elements 27a, 27b, onto the construction plane 10.

Figure 19:
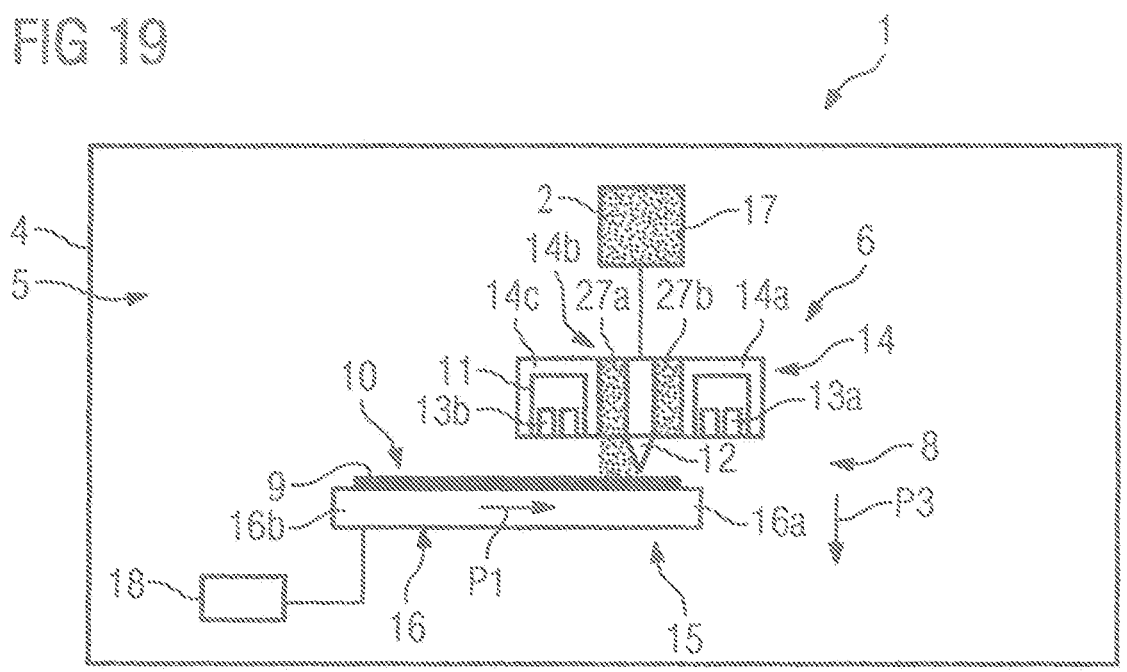

The carrying element 16 is again mounted movably between a first position (cf. FIG. 11) in which a first carrying element section 16a, i.e. for example a carrying element section 16a forming a first end region (right end region) of the carrying element 16, is arranged below the first application element 27a, and a second position (cf. FIG. 15) in which a second carrying element section 16b, i.e. for example a carrying element section 16b forming a second end region of the carrying element 16, is arranged below the second application element 27b. In order to move the carrying element 16 lying in the first position into the second position, a horizontal movement of the carrying element 16 to the right is carried out (cf. FIGS. 11-14, arrow P1). Conversely, a horizontal movement of the carrying element 16 to the left is carried out in order to move the carrying element 16 lying in the second position into the first position (cf. FIGS. 15-19, arrow P2). In FIG. 19, the carrying element 16 is moved (back) into the first position. Of course, the first and second positions may be interchanged; the comments above apply similarly.

Figure 11:
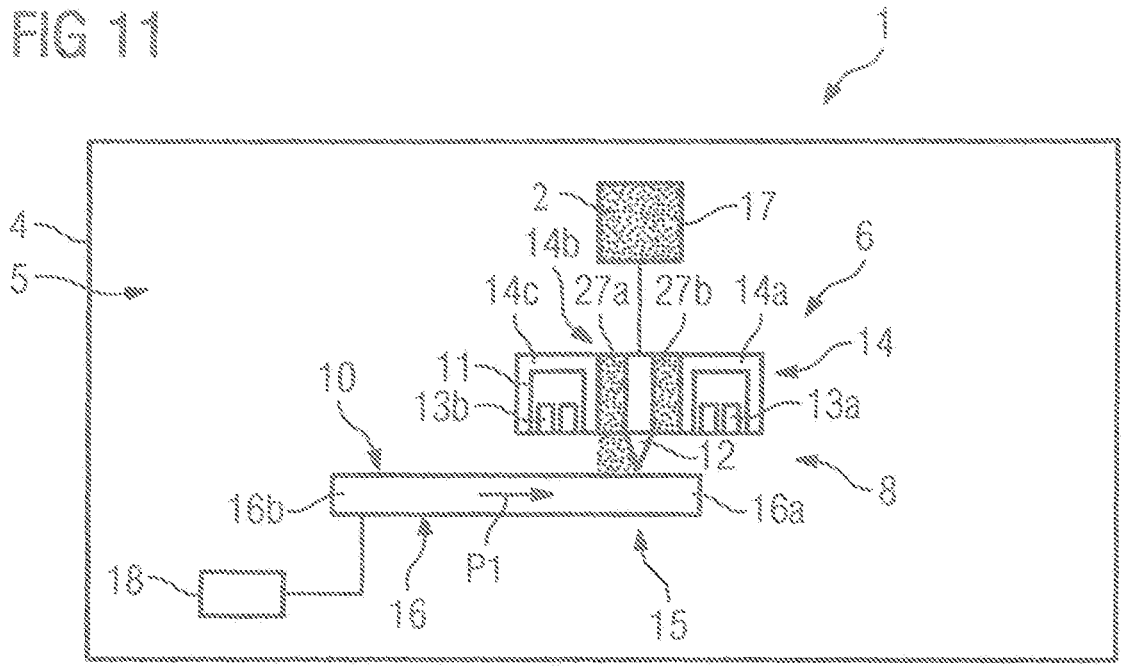
Figure 12:
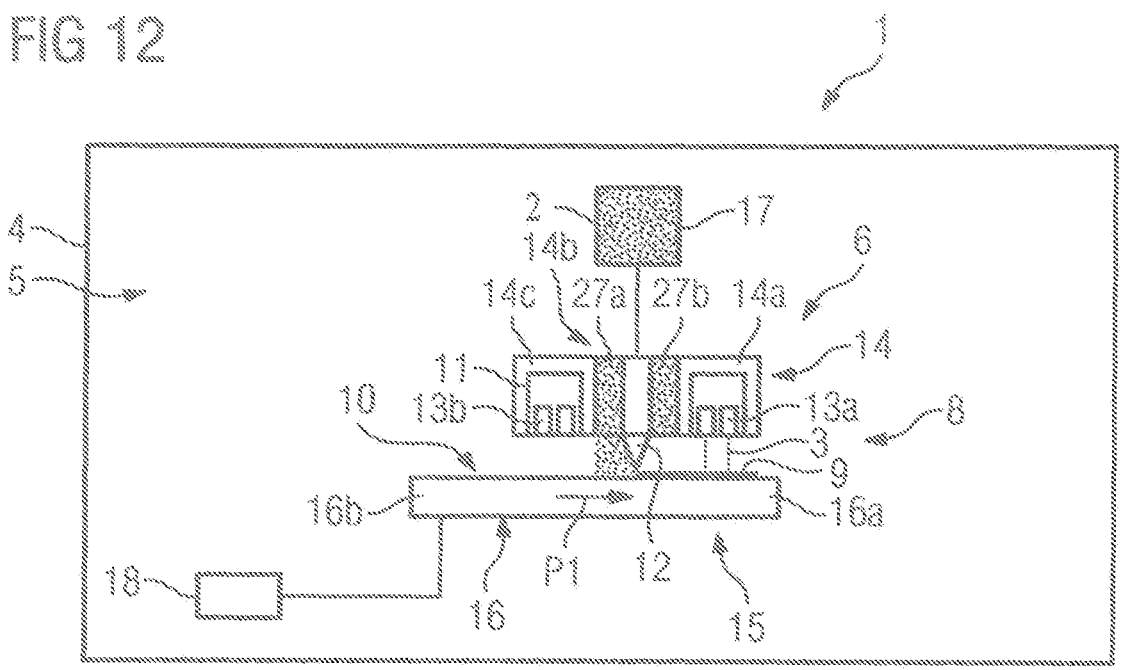
Figure 17:
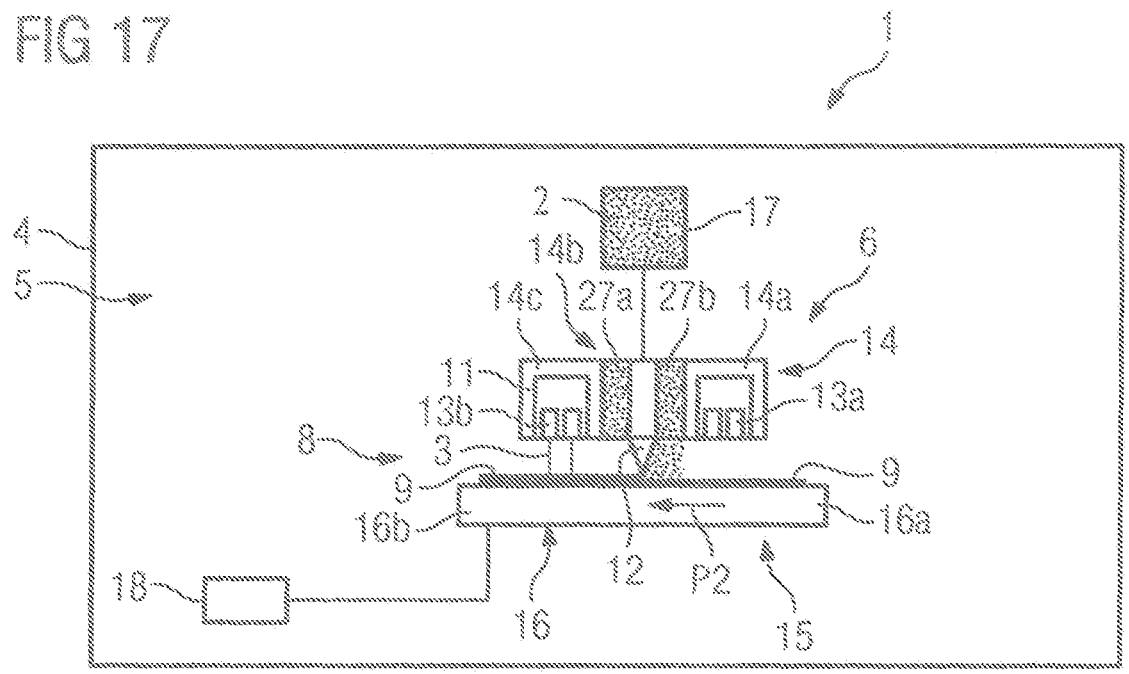
Figure 18:
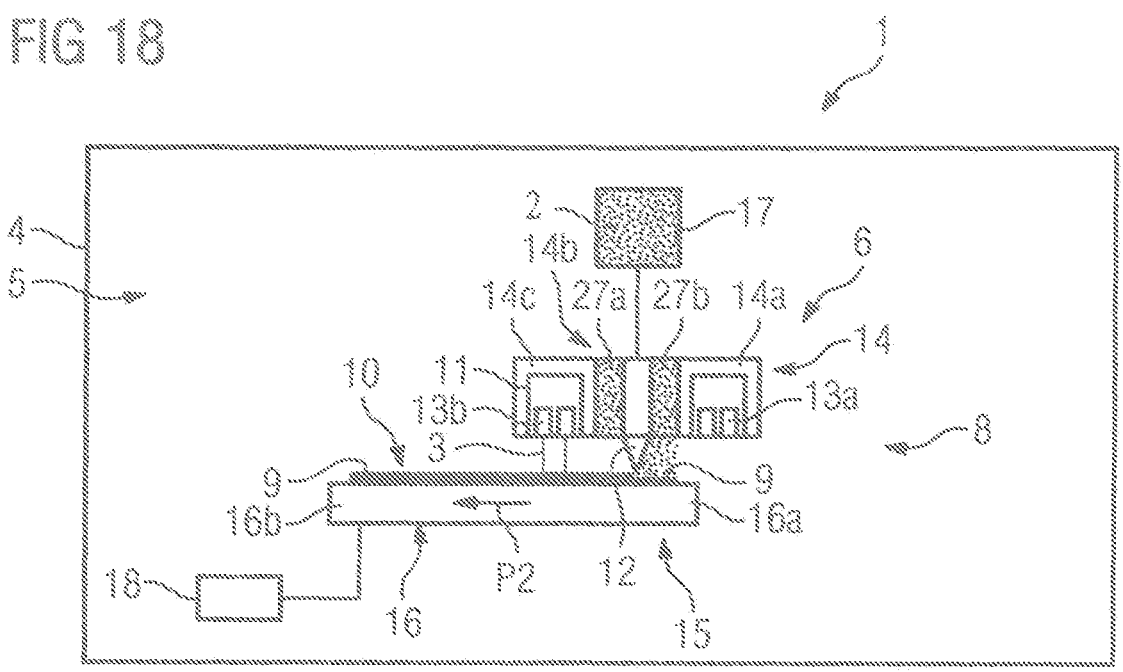

Starting from the configuration represented, in which the application elements 27a, 27b and the coating element 12 are arranged between the first group of illumination elements 13a (FIGS. 11-19, to the right of the coating device 8) and the second group of illumination elements 13b (FIGS. 11-19, to the left of the coating device 8), the application of construction material 2 during movement (cf. arrow P1) of the carrying element 16 starting from the first position (cf. FIG. 2) in the direction of the second position (cf. FIG. 6) is carried out by means of the first (left) application element 27a. The formation of the construction material layer 9 is carried out by means of the central coating element 12. In this context, FIGS. 11-15 are to be considered, with the aid of which the horizontal movement of the carrying element 16 in the direction of the arrow P1, starting from the first position as shown in FIG. 11 into the second position as shown in FIG. 15 can be seen. The selective illumination of the construction material layer 9 which has been formed, during the movement of the carrying element 16 in the direction of the second position, is carried out by means of the (right) illumination elements 13a associated with the first group. In a similar way, the application of further construction material 2, which is required for the formation of a further construction material layer 9, during movement of the carrying element 16 starting from the second position (cf. FIG. 15) in the direction of the first position (cf. FIGS. 11, 19) is carried out by means of the second (right) application element 27b. The formation of the construction material layer 9 is again carried out by means of the central coating element 12. In this context, FIGS. 15-19 are to be considered, with the aid of which the horizontal movement of the carrying element 16 in the direction of the arrow P2 starting from the second position as shown in FIG. 15 (back) into the first position as shown in FIGS. 11, 19 can be seen. The selective illumination of the construction material layer 9 which has been formed, during the movement of the carrying element 16 in the direction of the first position, is carried out by means of the (left) illumination elements 13b associated with the second group.

What is essential for the additive manufacturing process, in all cases, is that, before it is moved back into the first position, the carrying element 16 moved into the second position is moved, i.e. lowered, by a particular amount in the vertical direction, as indicated in FIGS. 6, 15. This vertical movement (lowering) of the carrying element 16 allows the formation, on a previously selectively solidified construction material layer 9, of a further construction material layer 9 to be selectively solidified and the selective illumination of this construction material layer 9 during the movement of the carrying element 16 back into the first position. In a similar way, the carrying element 16 moved back into the first position is moved, i.e. lowered, by a particular amount in the vertical direction. This vertical movement of the carrying element 16 allows the formation, on the previously selectively solidified construction material layer 9, of a further construction material layer 9 to be selectively solidified and the selective illumination of this construction material layer 9 during the movement of the carrying element 16 back into the second position.

Overall, an application process, a coating process and an illumination process may be carried out during each horizontal movement of the carrying element 16 relative to the assembly 6, i.e. independently of whether it is being moved in the direction of the first or second position ("plotter principle").

Figure 20:
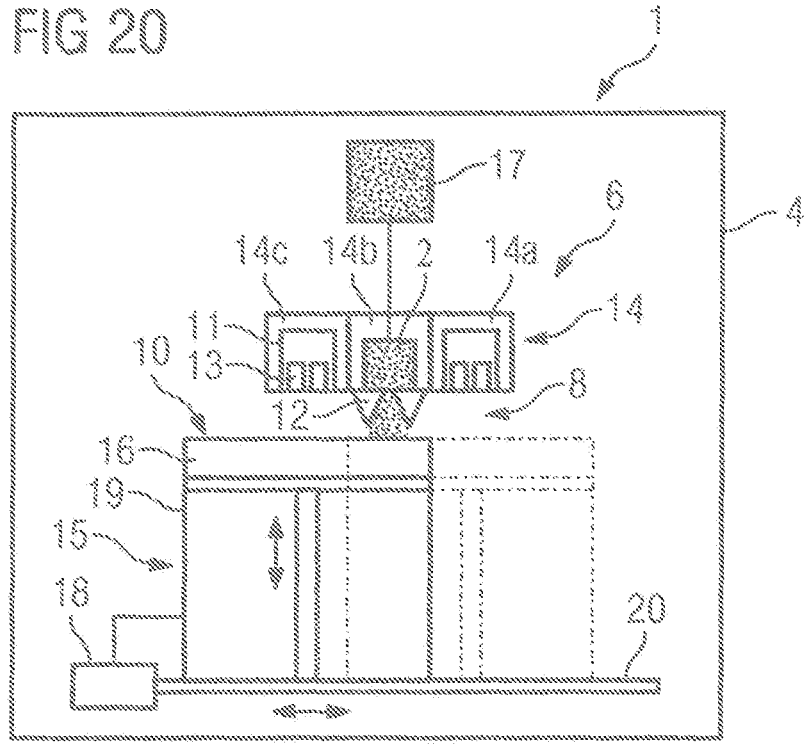
Figure 21:
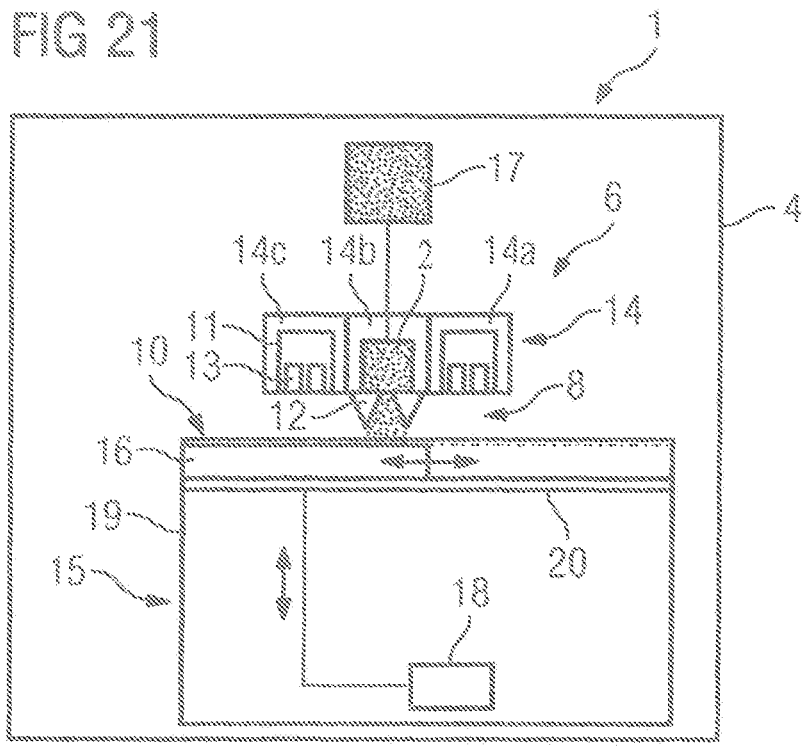

FIGS. 20, 21 respectively show a schematic representation of an apparatus 1 according to a further exemplary embodiment. Different variants for the conduct of respective movements of the carrying element 16 in the horizontally oriented movement plane relative to the assembly 6 can be seen with the aid of the exemplary embodiment shown in FIGS. 20, 21.

In the first variant, shown in FIG. 20, the carrying element 16 is arranged in a modular housing structure 19 ("construction container"), which is mounted movably in a horizontal direction, of the carrying device 15. The modular housing structure 19 is mounted movably in the horizontally oriented movement plane relative to the static assembly 6. It is thus not the carrying element 16 itself, but the entire modular housing structure 19, in which the carrying element 16 is arranged, that is mounted movably in the horizontal direction relative to the assembly 6. Movements of the carrying element 16 relative to the assembly 6 therefore result from movements of the modular housing structure 19 relative to the assembly 6. The carrying element 16 is arranged statically in the horizontal direction in the modular housing structure 19.

For driving, i.e. for setting the modular housing structure 19 in movement in the horizontally oriented movement plane relative to the assembly 6, the apparatus 1 comprises a drive device 18. The drive device 18 is coupled to the modular housing structure 19, and is configured in order to generate a drive force which moves the modular housing structure 19 in the horizontally oriented movement plane relative to the assembly. The drive device 18 may be configured as a linear drive. Specifically, the drive device 18 may be configured, for example, as a crank drive or a spindle drive. In order to carry out a guided movement of the modular housing structure 19 in the horizontal movement plane, or movement path, an e.g. rail-like guide device 20 may be arranged or configured in the housing structure 4 of the apparatus.

In the variant shown in FIG. 21, the carrying element 16 is arranged in a modular housing structure 19 of the carrying device 15, which is arranged or configured statically relative to the assembly 6. In this case, the carrying element 16 is thus mounted movably in(side) the modular housing structure 19 in the horizontally oriented movement direction relative to the assembly 6. The carrying element 16 is thus itself mounted movably in the horizontal direction relative to the assembly 6. Movements of the carrying element 16 relative to the assembly 6 therefore result from actual movements of the carrying element 16 inside and relative to the modular housing structure 19. The modular housing structure 19 is arranged statically in the horizontal direction on or in the housing structure 4 of the apparatus.

For driving, i.e. for setting the carrying element 16 in movement in the horizontally oriented movement plane relative to the assembly 6, the modular housing structure 19 comprises a drive device 18. The drive device 18 is coupled to the carrying element 16, and is configured in order to generate a drive force which moves the carrying device 16 in the horizontally oriented movement plane relative to the assembly 6. The drive device 18 may in this case also be configured as a linear drive. The drive device 18 may therefore in this case also be configured, for example, as a crank drive or a spindle drive. In order to carry out a guided movement of the carrying element 16 in the horizontal movement plane, or movement path, an e.g. rail-like guide device 20 may be arranged or configured in the modular housing structure 19. The guide device 20 may be mounted movably in the vertical direction, in order to carry out lowering of the carrying element 16.

For the variants shown in FIGS. 20, 21, it is likewise the case that the modular housing structure 19 can be removed in the manner of a replaceable container from the housing structure 4 of the apparatus. The modular housing structure 19, or the carrying device 15, can therefore be removed when required from the housing structure 4 of the apparatus, and fastened when required on the housing structure 4 of the apparatus.

FIG. 22 shows a schematic representation of an apparatus 1 according to another exemplary embodiment. With the aid of the exemplary embodiment shown in FIG. 22, it can be seen that functional elements of further functional component parts of the apparatus 1 may additionally be arranged or configured in the reception structure 14, i.e. in respective reception compartments 14a-14i provided therefor, and may therefore be arranged or configured in a structurally integrated way in the reception structure 14. Corresponding arrangement or configuration of respective functional elements of further functional component parts of the apparatus 1 likewise requires that these further functional elements too be arranged or configured statically, or fixed in position, on the housing structure 4 of the apparatus.

Corresponding further functional component parts of the apparatus 1 are, in the exemplary embodiment shown in FIG. 22, a suction device 21, a smoothing and/or planarizing device 22, and a detection device 23. It can be seen that the aforementioned functional component parts of the apparatus 1, or the functional elements associated with them, are present in a symmetrical and therefore redundant arrangement with respect to the centrally arranged coating device 8.

The suction device 21 is used for suction of construction material 2 detached from a construction material layer 9 as a result of the construction process ("weld splashes") and/or for suction of process gases produced as a result of the construction process. The suction device 21 comprises suction elements 24, by means of which it is possible to form a suction flow that allows for removal of construction material detached from a construction material layer 9 as a result of the construction process and/or for suction of process gases produced as a result of the construction process. The suction elements 24 are arranged in the reception compartments 14d, 14g arranged next to the reception compartments 14a, 14c which receive the illumination elements 13.

The smoothing and/or planarizing device 22 is configured for smoothing and/or planarization of selectively solidified construction material layers 9. The smoothing and/or planarizing device 22 comprises smoothing and/or planarizing elements 25, by means of which it can act mechanically on a selectively solidified construction material layer 9 in order to remove nonuniformities produced as a result of the construction process in the construction material layer 9, i.e. for example crater-like elevations, i.e. smooth or planarize the construction material layer 9 before a further construction material layer 9 is formed thereon. The smoothing and/or planarizing elements 25 are configured for example as grinding elements which can be driven in rotation ('grinding rollers') The smoothing and/or planarizing elements 25 are arranged in the reception compartments 14e, 14h arranged next to the reception compartments 14d, 14g which receive the suction elements 24.

The detection device 23 is configured in order to detect at least one detection variable describing the quality of a construction material layer 9 which is to be solidified and/or has been selectively solidified, i.e. in particular its surface. The detection device 23 comprises detection elements 26, by means of which image data of a construction material layer 9 which is to be solidified and/or has been selectively solidified can be recorded. The detection elements 26 are configured as optical imaging elements, in particular as cameras. The detection elements 26 are arranged in the reception compartments 14f, 14i arranged next to the reception compartments 14e, 14h which receive the smoothing and/or planarizing elements 25.

Image data recorded by means of the detection elements 26 are evaluated qualitatively or quantitatively for particular detection variables describing the quality of the construction material layer 9 by means of suitable evaluation algorithms. Corresponding detection variables may be features which influence the quality of the construction material layer 9, i.e. for example nonuniformities, for example crater-like elevations, irregularities, etc., of a construction material layer 9. The recorded, and optionally correspondingly evaluated, image data may be visualized by means of suitable visualization algorithms, so that a two- or three-dimensional (topological) image, in particular of the surface, of a construction material layer 9 can be compiled and displayed on a suitable display device (not shown), which optionally forms a constituent part of the apparatus 1.

For all the exemplary embodiments shown in the Figs, it is the case that the carrying element 16, optionally the entire carrying device 15 may be vibrationally decoupled from the housing structure 4 of the apparatus. This prevents the introduction of vibrations generated during movements of the carrying element 16 relative to the assembly 6, and consequent possible impairment of illumination processes. The vibrational decoupling is carried out by means of suitable decoupling elements (not represented in detail) or structures, i.e. for example elastomer elements or structures, connected between the carrying element 16 or the carrying device 15 and the assembly 6.

By means of the apparatuses 1 shown in the Figs, a method for additive manufacturing of a three-dimensional object by successive layerwise selective solidification of construction material layers of solidifiable construction material 2 by means of at least one energy beam 3 may respectively be carried out. The method may be a selective laser melting method (SLM method) or a selective laser sintering method (SLS method).

Individual, several or all of the features presented in relation to a particular exemplary embodiment may be applied to at least one other exemplary embodiment.

LIST OF REFERENCES 1 apparatus
2 construction material
3 energy beam
4 housing structure
5 process chamber
6 assembly
8 coating device
9 construction material layer
10 construction plane
11 illumination device
12 coating element
13 illumination element
14 reception structure
14a-i reception compartment
15 carrying device
16 carrying element
17 storage device
18 drive device
19 modular housing structure
20 guide device
21 suction device
22 smoothing and/or planarizing device
23 detection device
24 suction element
25 smoothing and/or planarizing element
26 detection element
27 application element
P1-P3 arrow

The invention claimed is:

1. An apparatus for additive manufacturing of a three-dimensional object by successive layer-by-layer selective illumination and selective solidification of construction material layers formed in a construction plane having a construction material that can be solidified by at least one energy beam, the apparatus comprising:
   a housing structure;
   a combined coating and illumination assembly arranged or formed on the housing structure of the apparatus, comprising:
      a coating device provided for applying the construction material into the construction plane and for forming construction material layers to be solidified in the construction plane, the coating device comprising:
         a first application element;
         a second application element arranged adjacently to the first application element; and
         a coating element disposed between the first application element and the second application element; and
      an illumination device provided for the selective illumination of respective construction material layers formed in the construction plane by the coating device; and
   a carrying device which comprises at least one carrying element that comprises the construction plane and is movably supported in a horizontal movement plane relative to the combined coating and illumination assembly;
   wherein each of the first and second application elements is provided to apply a certain amount of construction material onto the construction plane laterally adjacent to the coating element, wherein the application of a construction material onto the construction plane is performed:
      with the first application element when moving the carrying element from a first position towards a second position, and
      with the second application element when moving the carrying element from the second position towards the first position.

2. The apparatus as claimed in claim 1, wherein the carrying element is formed on or in a movably supported modular housing structure of the carrying device, wherein the modular housing structure is movably supported in the horizontal movement plane relative to the combined coating and illumination assembly.

3. The apparatus as claimed in claim 2, further comprising at least one drive unit that can be coupled with or is coupled with the modular housing structure of the carrying device or the carrying element, the at least one drive unit provided to create a driving force moving the modular housing structure or the carrying element in the horizontal movement plane relative to the combined coating and illumination assembly.

4. The apparatus as claimed in claim 1, further comprising at least one of:
- a suction device arranged or formed on the housing structure of the apparatus, the suction device provided for the suction of construction material loosened from a construction material layer related to the construction process and/or for the suction of process gases arising related to the construction process;
- a smoothing and/or planarizing device firmly arranged or formed on the housing structure of the apparatus, which is provided for at least partially smoothing and/or planarizing a selectively solidified construction material layer; or
- a detection device arranged or formed on the housing structure of the apparatus, which is provided for the detection of at least one detection variable describing the quality of a construction material layer that is to be solidified and/or is selectively solidified.

5. The apparatus as claimed in claim 1, further comprising:
- a reception structure attached to the housing structure of the apparatus, in which at least the coating device and the illumination device arranged or formed in a structurally integrated manner.

6. The apparatus as claimed in claim 5, wherein the reception structure comprises a plurality of separate reception compartments, wherein respective functional elements associated with the coating device, and respective functional elements associated with the illumination device are arranged in said separate reception compartments respectively associated.

7. The apparatus as claimed in claim 6, wherein respective reception compartments are removably connected with each other during forming the reception structure.

8. The apparatus as claimed in claim 1, wherein the illumination device comprises a plurality of illumination elements respectively provided for the generation of an energy beam for the selective illumination of a construction material layer to be selectively solidified, wherein
the coating device is arranged or formed between a first number of illumination elements, and a second number of illumination elements.

9. The apparatus as claimed in claim 1, wherein the coating device comprises a plurality of coating elements adjacently arranged, and at least one further application element, wherein the at least one further application element is provided to apply a certain amount of construction material between at least two of the plurality of coating elements onto the construction plane.

10. The apparatus as claimed in claim 1, wherein the carrying element is movable between:
the first position in which a first carrying element portion is movably arranged below the coating device, and
the second position in which a second carrying element portion is movably arranged below the coating device.

11. The apparatus as claimed in claim 8, wherein the coating device comprises:
a plurality of coating elements adjacently arranged, and
at least one further application element, wherein the at least one further application element is provided to apply a certain amount of construction material onto the construction plane between at least two of the plurality of coating elements, wherein forming of a construction material layer is performed when moving the carrying element from the first position towards the second position via a first coating element, and the illumination of the formed construction material layer is performed during the movement of the carrying element towards the second position by at least one of the illumination elements associated with the first number, and forming of a construction material layer is performed when moving the carrying element from the second position towards the first position via a second coating element, and the illumination of the formed construction material layer is performed during the movement of the carrying element towards the first position by at least one of the illumination elements associated with the second number.

12. The apparatus as claimed in claim 8, wherein the illumination of the construction material layer formed by the coating element is performed during the movement of the carrying element towards the second position by at least one of the illumination elements associated with the first number, and
the illumination of the construction material layer formed by the coating element is performed during the movement of the carrying element towards the first position by at least one of the illumination elements associated with the second number.

13. The apparatus as claimed in claim 10, wherein the carrying element is supported vertically movably.

14. The apparatus as claimed in claim 1, wherein at least the carrying element of the housing structure of the device is vibration-isolated.

15. The apparatus as claimed in claim 1, further comprising a supply device associated with the coating device, wherein the supply device can be connected with or is connected with the coating device such that a certain amount of construction material can be continuously or discontinuously supplied to the coating device via the supply device.

16. The apparatus as claimed in claim 1, wherein an illumination element is formed as a laser diode element or an optical element that can be coupled with or is coupled with a laser diode element, or as a scanner element as part of an optical scanner device.

17. A method for additive manufacturing of at least one three-dimensional object by successive, selective layer-by-layer illumination and thus solidification of individual construction material layers of a construction material that can be solidified with an energy beam, the method comprising:
selectively illuminating, with an illumination device of a combined coating and illumination assembly, respective construction material layers formed in a construction plane by a coating device;
movably supporting a carrying device, comprising at least one carrying element that comprises the construction plane, relative to the combined coating and illumination assembly in a horizontal movement plane;
applying, with a first application element of the coating device, a certain amount of construction material onto the construction plane when moving the carrying element from a first position towards a second position;
applying, with a second application element of the coating device adjacently arranged to the first application element, a certain amount of construction material onto the construction plane when moving the carrying element from the second position towards the first position; and coating, with a coating element of the coating device disposed between the first and second application elements, a construction material to the construction plane for forming construction material layers.

18. The apparatus according to claim 1, wherein the carrying element is arranged or formed on or in a modular housing structure of the carrying device that is arranged or formed relative to the combined coating or illumination assembly, wherein the carrying element is movably supported on or in the modular housing structure in the horizontal movement plane relative to the combined coating and illumination assembly.

19. The apparatus as claimed in claim 14, wherein the entire carrying device of the housing structure of the device is vibration-isolated.

20. The method as claimed in claim 17, wherein the at least one carrying element is formed on or in a movably supported modular housing structure of the carrying device, wherein the modular housing structure is movably supported in the horizontal movement plane relative to the combined coating and illumination assembly.

* * * * *